United States Patent [19]

Takano et al.

[11] Patent Number: 5,509,301
[45] Date of Patent: Apr. 23, 1996

[54] COVER-EQUIPPED TESTER FOR INTERNAL COMBUSTION ENGINES

[75] Inventors: Ryosuke Takano, Nishinomiya; Toshiaki Hayashi, Kobe; Kazuhiko Miyoshi, Amagasaki; Junzo Iwaoka, Osaka, all of Japan

[73] Assignee: Daifuku Co., Ltd., Osaka, Japan

[21] Appl. No.: 45,049

[22] Filed: Apr. 8, 1993

[30] Foreign Application Priority Data

Sep. 4, 1992 [JP] Japan ................... 4-236635
Sep. 17, 1992 [JP] Japan ................... 4-246948
Nov. 6, 1992 [JP] Japan ................... 4-296684

[51] Int. Cl.⁶ .................................. F16M 1/02
[52] U.S. Cl. .............................. 73/116; 74/608
[58] Field of Search ................. 73/118.1, 116, 73/117.1; 206/319; 74/608, 609, 612; 150/157, 161, 165; 190/1, 4, 11, 20; 280/47.38, 47.39; 296/10, 35.4, 37.4, 108, 118

[56] References Cited

U.S. PATENT DOCUMENTS

| | | | |
|---|---|---|---|
| 2,126,342 | 8/1938 | Nippert | 73/118.1 |
| 2,543,597 | 2/1951 | Peery | 190/1 |
| 2,741,830 | 4/1956 | Lewis | 73/118.1 |
| 2,823,925 | 2/1958 | Withers | 280/47.38 |
| 3,524,344 | 8/1970 | Converse, III et al. | 73/118.1 |
| 3,697,865 | 10/1972 | Smith et al. | 73/118.1 |
| 3,783,709 | 1/1974 | Scott | 74/612 |
| 3,834,221 | 9/1974 | Swis et al. | 73/116 |
| 3,866,937 | 2/1975 | Goldfarb | 280/47.38 |
| 3,929,372 | 12/1975 | Gesslein | 280/47.38 |
| 4,285,233 | 8/1981 | Swis | 73/116 |
| 4,592,228 | 6/1986 | Lucia | 73/118.1 |
| 4,602,499 | 7/1986 | Norton et al. | 73/116 |
| 4,838,530 | 6/1989 | Chyba et al. | 269/71 |
| 4,941,347 | 7/1990 | Iijima et al. | 73/116 |

FOREIGN PATENT DOCUMENTS

| | | |
|---|---|---|
| 7809596A1 | 8/1978 | Germany . |
| 0682340 | 3/1994 | Japan . |
| 0682341 | 3/1994 | Japan . |
| 577374 | 8/1945 | United Kingdom . |
| 1101083 | 1/1968 | United Kingdom . |
| 1521060 | 8/1978 | United Kingdom . |
| 1600135 | 10/1981 | United Kingdom . |
| 2194976A | 3/1988 | United Kingdom . |
| 2235477A | 3/1991 | United Kingdom . |

Primary Examiner—Richard Chilcot
Assistant Examiner—Eric S. McCall
Attorney, Agent, or Firm—Barnes, Kisselle, Raisch, Choate, Whittemore & Hulbert

[57] ABSTRACT

A tester for internal combustion engines is composed of an internal combustion engine support block and a controller and is provided with a cover comprising a pair of lateral plates disposed on opposite sides of the internal combustion engine support block and an outer plate disposed between the outer edges of the lateral plates, the cover being turnable with the inner ends of the lateral plates serving as fulcrums. And a pit is formed under the internal combustion engine support block. The cover is adapted to be opened and closed by turning movement and the opened cover is received in the pit.

11 Claims, 34 Drawing Sheets

COVER-EQUIPPED TESTER FOR INTERNAL COMBUSTION ENGINES

FIELD OF THE INVENTION

The present invention relates to an internal combustion engine tester for making a performance test on an internal combustion engine before it is built into a vehicle body, for example, in an automobile assembling plant.

BACKGROUND OF THE INVENTION

Heretofore, internal combustion engine testers of this type have had the following arrangement: Support legs for supporting an internal combustion engine to be tested are erected on a base block. And an internal combustion engine supported on the support legs is covered with a cover device.

More particularly, the cover device comprises fixed covers for covering the front and rear of the supported internal combustion engine, and a movable cover for covering the opposite lateral sides and top of the internal combustion engine. The fixed covers are formed of stainless steel plate and fixedly erected on the base block. The movable cover is formed of stainless steel plate and is gate-shaped as seen in front view, comprising opposed lateral plates and a top plate connected between the upper ends of said lateral plates. The lower ends of said movable cover have wheels attached thereto to run on rails laid on the base block. Thus, the movable cover is movable between a closed position which is between said fixed covers and an opened position located rearwardly of the rear fixed cover as it is supported and guided by the rails through the wheels. A starter for starting the internal combustion engine is installed rearwardly of the rear fixed cover.

According to this arrangement, in testing an internal combustion engine, the movable cover is slid to the closed position for closing operation. Thereby, the front and rear of the internal combustion engine are covered with the fixed covers and its lateral sides and top are covered with the movable cover. Thereafter, the internal combustion engine is started by the starter to make various tests. At this time, the noise from the internal combustion engine is shut in the cover device. After test, tile movable cover is slid to the open position for opening operation and the internal combustion engine is taken out upwardly from between the fixed covers.

With this conventional type, however, after the movable cover has been slid rearwardly for opening operation, the fixed covers remain fixed on the base block; therefore, there has been a problem that a sufficiently wide operating space cannot be secured. To solve this problem, it would be contemplated to slide the fixed covers together with the movable cover. However, to enable the front fixed cover to avoid colliding with the internal combustion engine, it has to be moved in a direction different from that for the movable cover, a solution which complicates the construction.

Further, since the movable cover is rearwardly slid for opening operation, a cover opening space of approximately the same length and width as those of the movable cover is required rearwardly of the testing space for the internal combustion engine; thus, there has been a problem that the tester installation space is extremely increased lengthwise.

Another problem is that when the movable cover is opened, the movable cover which has been slid and stopped forms an obstacle interfering with the operation. Further, since the fixed covers and movable cover are made of stainless steel, the internal combustion engine housed in the covers cannot be seen therethrough; therefore, if a failure takes place in the internal combustion engine, it has been difficult for the operator to find it quickly.

Further, when the movable cover is moved for closing operation, there is a danger of operator's fingers being caught between the closing end of the movable cover and the front fixed cover. Further, the heat produced by the internal combustion engine during test remains in the cover device, making it difficult to control the temperature in the cover device.

DISCLOSURE OF THE INVENTION

The present invention, which is intended to solve the above problems, provides a cover-equipped tester for internal combustion engines which is capable of covering the internal combustion engine support block without using fixed covers, saving the tester installation space, with no possibility of the cover interfering with the operation, while minimizing the space occupied by the cover when the latter is opened.

To achieve the above object, the invention provides a cover-equipped tester for internal combustion engines, which is characterized in that a cover which covers the internal combustion engine support block from above is turnable. The present invention has merits that the operation for placing an internal combustion engine on the internal combustion engine support block when the cover is in the opened position is facilitated and that the operator is given easy access to the internal combustion engine on the internal combustion engine support block.

According to an embodiment of the invention, at least part of the turnable cover is transparent.

According to another embodiment of the invention, the internal combustion engine tester provided with a ventilator fox ventilating the cover device.

According to another embodiment of the invention, the closing end of the turnable cover is provided with a detector for detecting a foreign matter present between the cover and the controller.

According still another embodiment of the invention, the closing end of the turnable cover overlaps the outer side of the controller.

DESCRIPTION OF THE PREFERRED EMBODIMENTS

Prior to description of embodiments of the invention, a conventional internal combustion engine tester of this type will be described.

Figure 34:
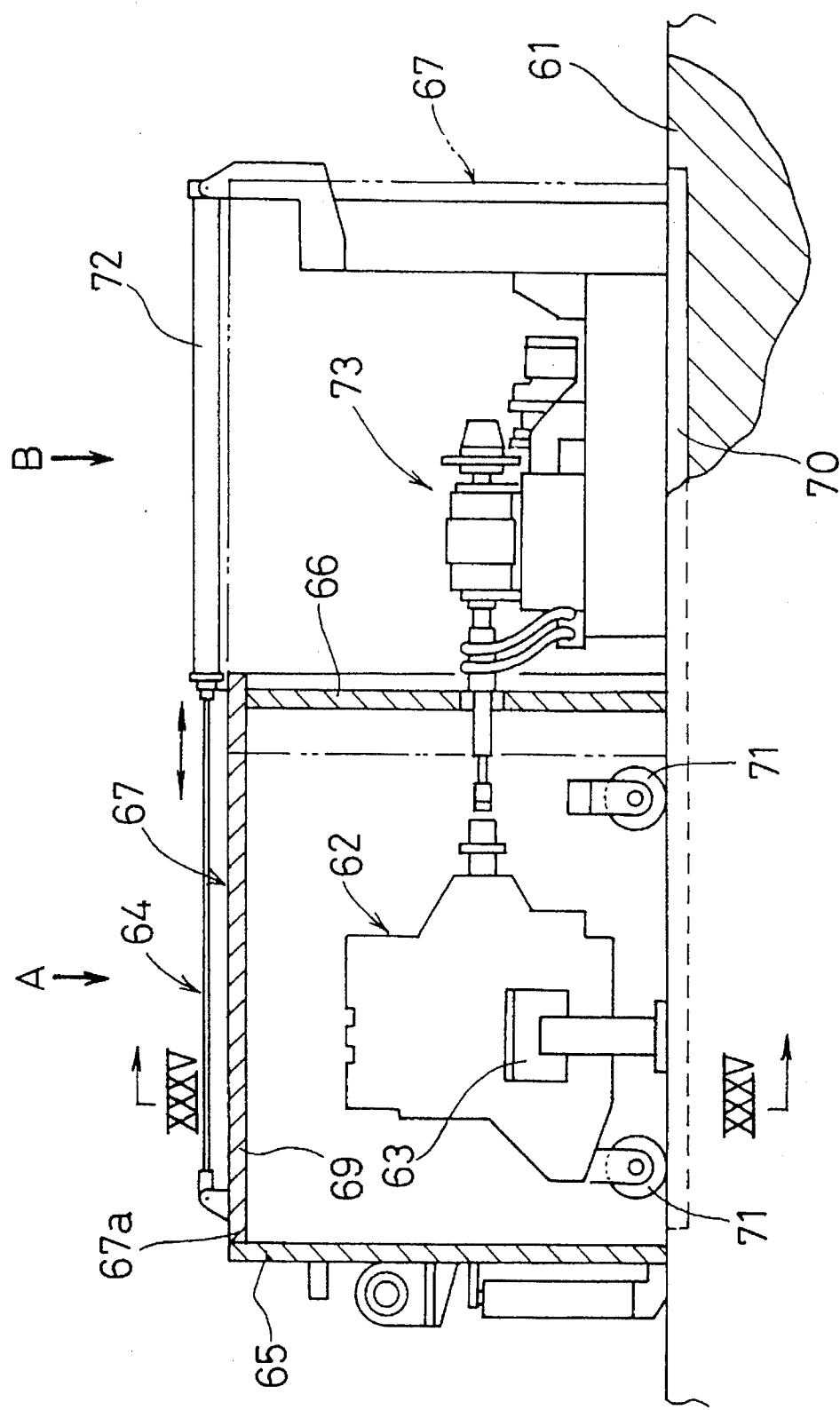
FIG. 34 is a side view, in longitudinal section, of a conventional cover-equipped tester for internal combustion engines.
Figure 35:
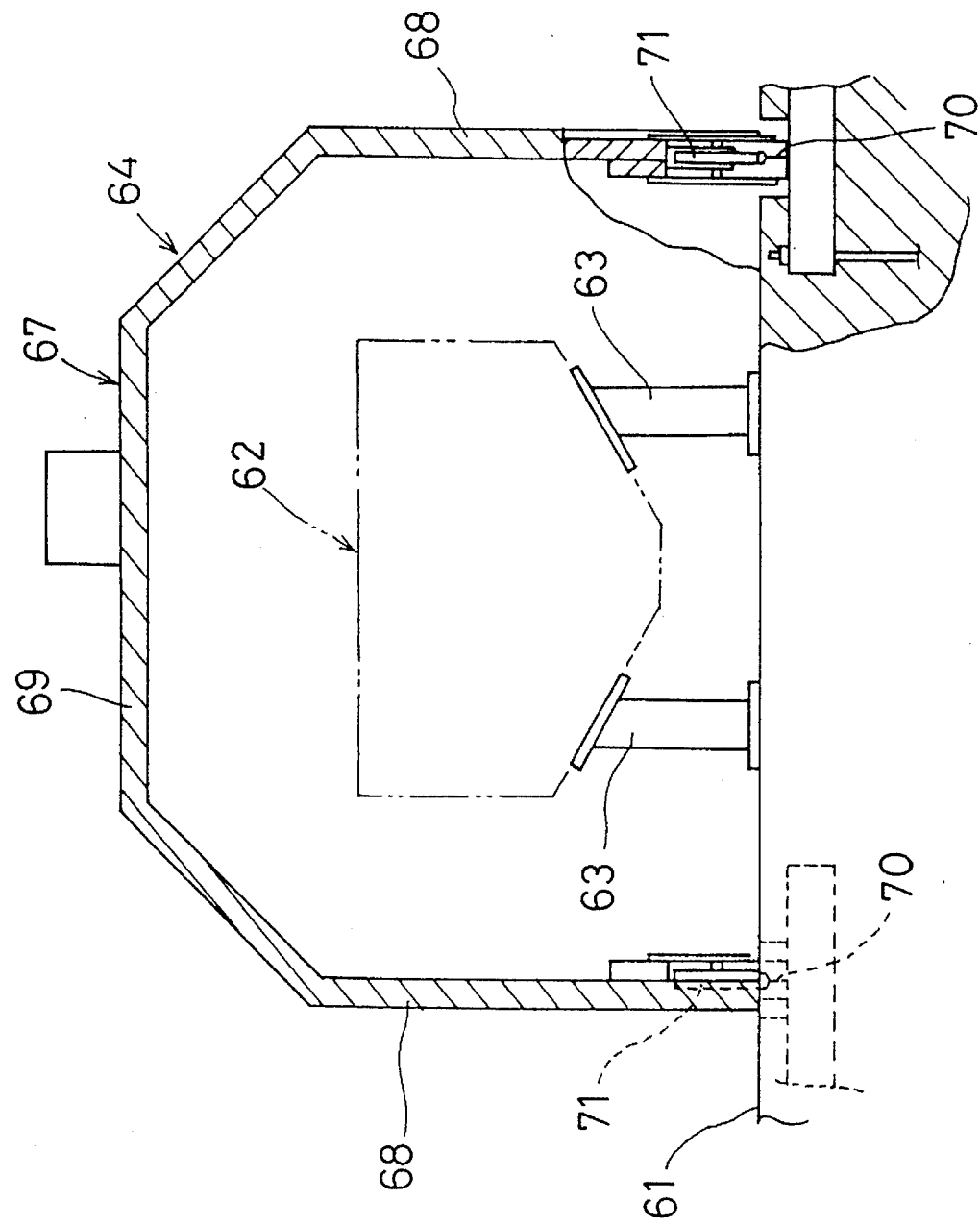
FIG. 35 is a view taken in the direction of arrow XXXV—XXXV in FIG. 34.

A conventional internal combustion engine tester of this type is shown in FIGS. 34 and 35. Support legs 63 for supporting an internal combustion engine 62 to be tested are erected on a base block 61. And the internal combustion engine 62 supported on the support legs 63 is covered with a cover device 64.

More particularly, the cover device 64 comprises fixed covers 65 and 66 for covering the front and rear of the supported internal combustion engine, and a movable cover 67 for covering the opposite lateral sides and top of the internal combustion engine 62. The fixed covers 65 and 66 are formed of stainless steel plate and fixedly erected on the base block 61. The movable cover 67 is formed of stainless steel plate and is gate-shaped as seen in front view, comprising opposed lateral plates 68 and a top plate 69 connected between the upper ends of said lateral plates 68. The lower ends of said movable cover 67 have wheels 71 attached thereto to run on rails 70 laid on the base block. Thus, the movable cover 67 is movable between a closed position A which is between said fixed covers 65 and 66 and an opened position B located rearwardly of the rear fixed cover 66 as it is supported and guided by the rails 70 through the wheels 71. A starter 73 for starting the internal combustion engine 62 is installed rearwardly of the rear fixed cover 66.

According to this arrangement, in testing the internal combustion engine 62, as shown in solid lines in FIG. 34, the movable cover 67 is slid to the closed position A for closing operation. Thereby, the front and rear of the internal combustion engine 62 are covered with the fixed covers 65 and 66 and its lateral sides and top are covered with the movable cover 67. Thereafter, the internal combustion engine 62 is started by the starter 73 to make various tests. At this time, the noise from the internal combustion engine 62 is shut in the cover device 64. After test, the movable cover 67 is slid to the open position B for opening operation and the internal combustion engine 62 is taken out upwardly from between the fixed covers 65 and 66.

With the conventional type, however, after the movable cover 67 has been slid rearwardly for opening operation, the fixed covers 65 and 66 remain fixed on the base block 61; therefore, there has been a problem that a sufficiently wide operating space cannot be secured. To solve this problem, it would be contemplated to slide the fixed covers 65 and 66 together with the movable cover 67. However, to enable the front fixed cover 65 to avoid colliding with the internal combustion engine 62, it has to be moved in a direction different from that for the movable cover 67, a solution which complicates the construction.

Further, since the movable cover 67 is rearwardly slid for opening operation, a cover opening space of approximately the same length and width as those of the movable cover 67 is required rearwardly of the testing space for the internal combustion engine 62; thus, there has been a problem that the tester installation space is extremely increased lengthwise.

Another problem is that when the movable cover 67 is opened, the movable cover 67 which has been slid and stopped forms an obstacle interfering with the operation. Further, since the fixed covers 65 and 66 and movable cover 67 are made of stainless steel, the internal combustion engine 62 housed in the covers 65, 66 and 67 cannot be seen therethrough; therefore, if a failure takes place in the internal combustion engine 62, it has been difficult for the operator to find it quickly.

Further, when the movable cover 67 is moved for closing operation, there is a danger of operator's fingers being caught between the closing end 67a of the movable cover 67 and the front fixed cover 65. Further, the heat produced by the internal combustion engine 62 during test remains in the cover device 64, making it difficult to control the temperature in the cover device 64.

The present invention has solved these problems.

An embodiment of the invention will now be described with reference to FIGS. 1 through 10.

Figure 10:
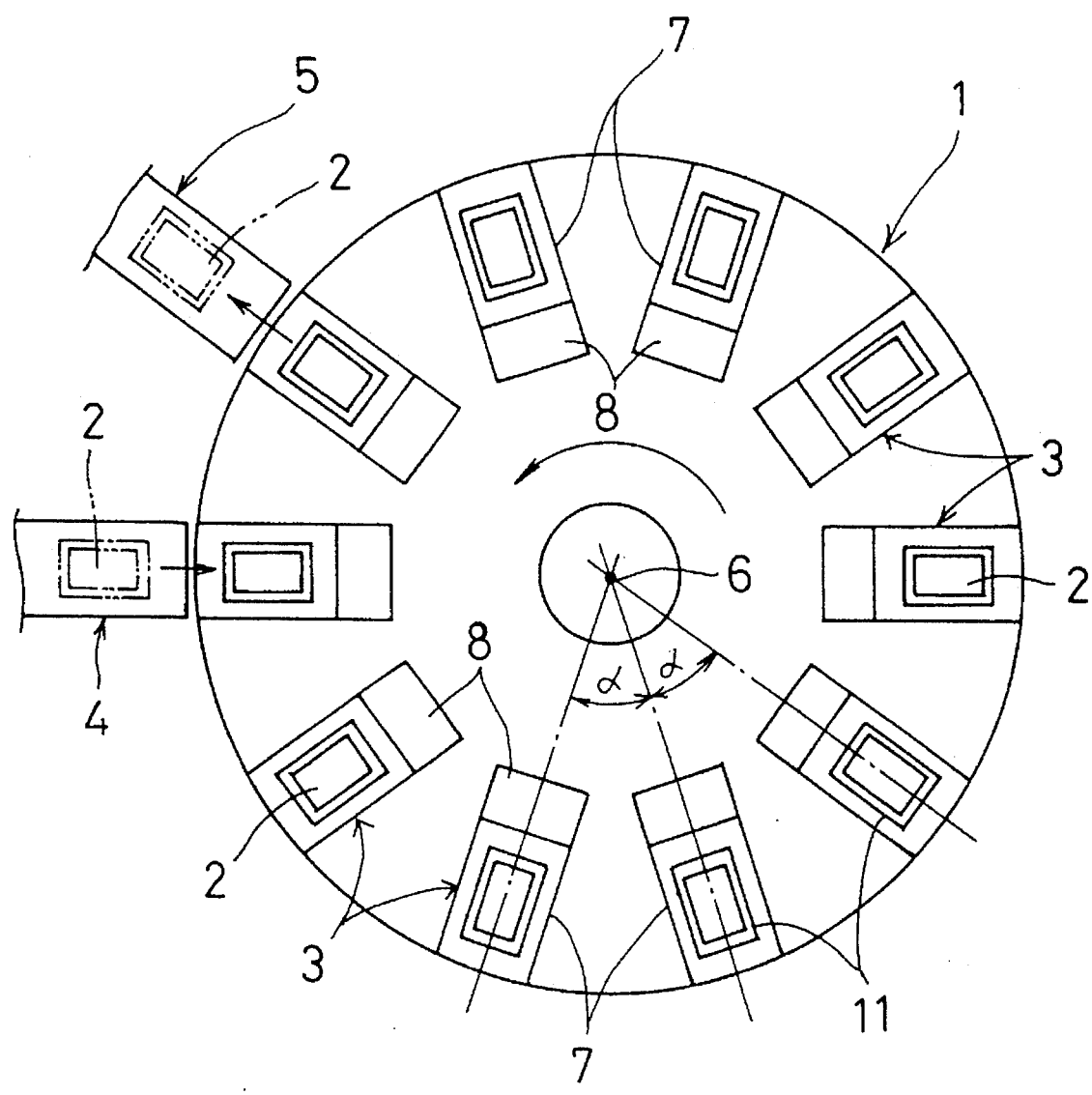
FIG. 10 is a plan view showing the disposition of the internal combustion engine testers.

As shown in FIG. 10, a turntable 1 is rotated intermittently through a preset angle a around the vertical axis 5 by a rotation drive device (not shown). Testers 3 for internal combustion engines 2 are radially disposed at a plurality of equally angularly spaced circumferential places on the turntable 1. The numeral 4 denotes a carrying-in device for feeding internal combustion engines 2 into the testers 3 and 5 denotes a carrying-out device for withdrawing the internal combustion engines 2 from the testers 3.

Figure 2:
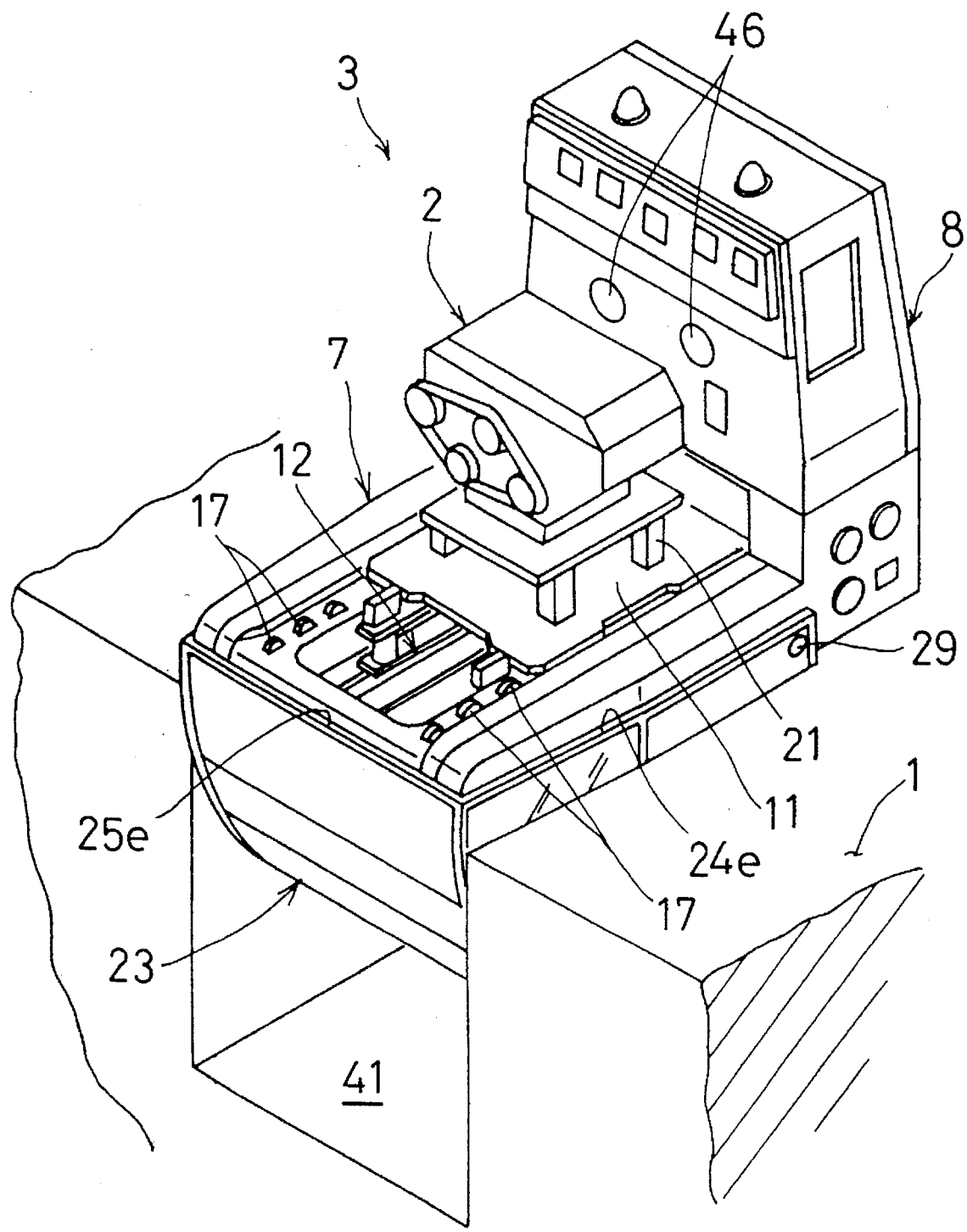
FIG. 2 is a perspective view showing the opened state of the cover of the internal combustion engine tester.
Figure 3:
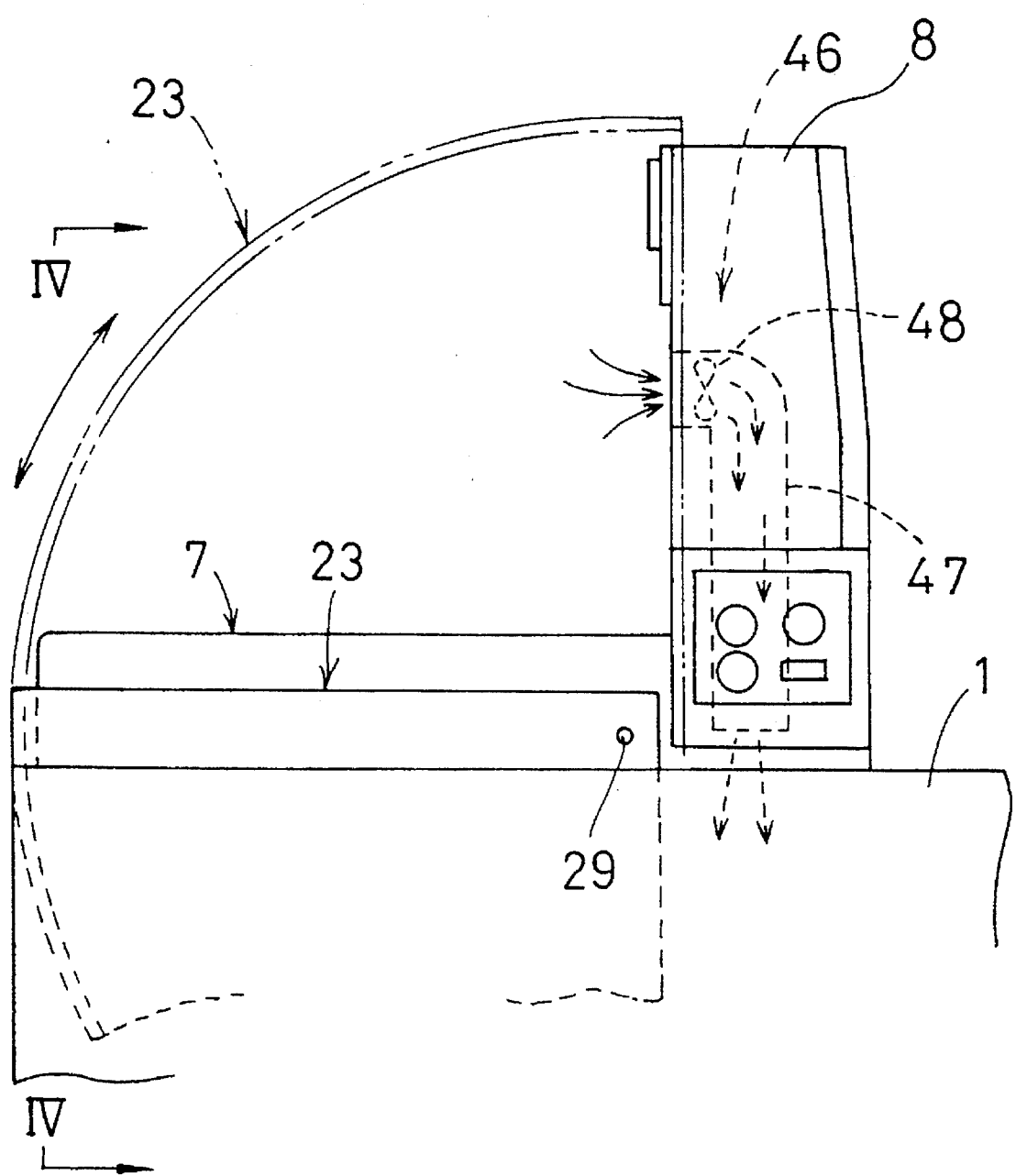
FIG. 3 is a schematic perspective view of the internal combustion engine tester.
Figure 4:
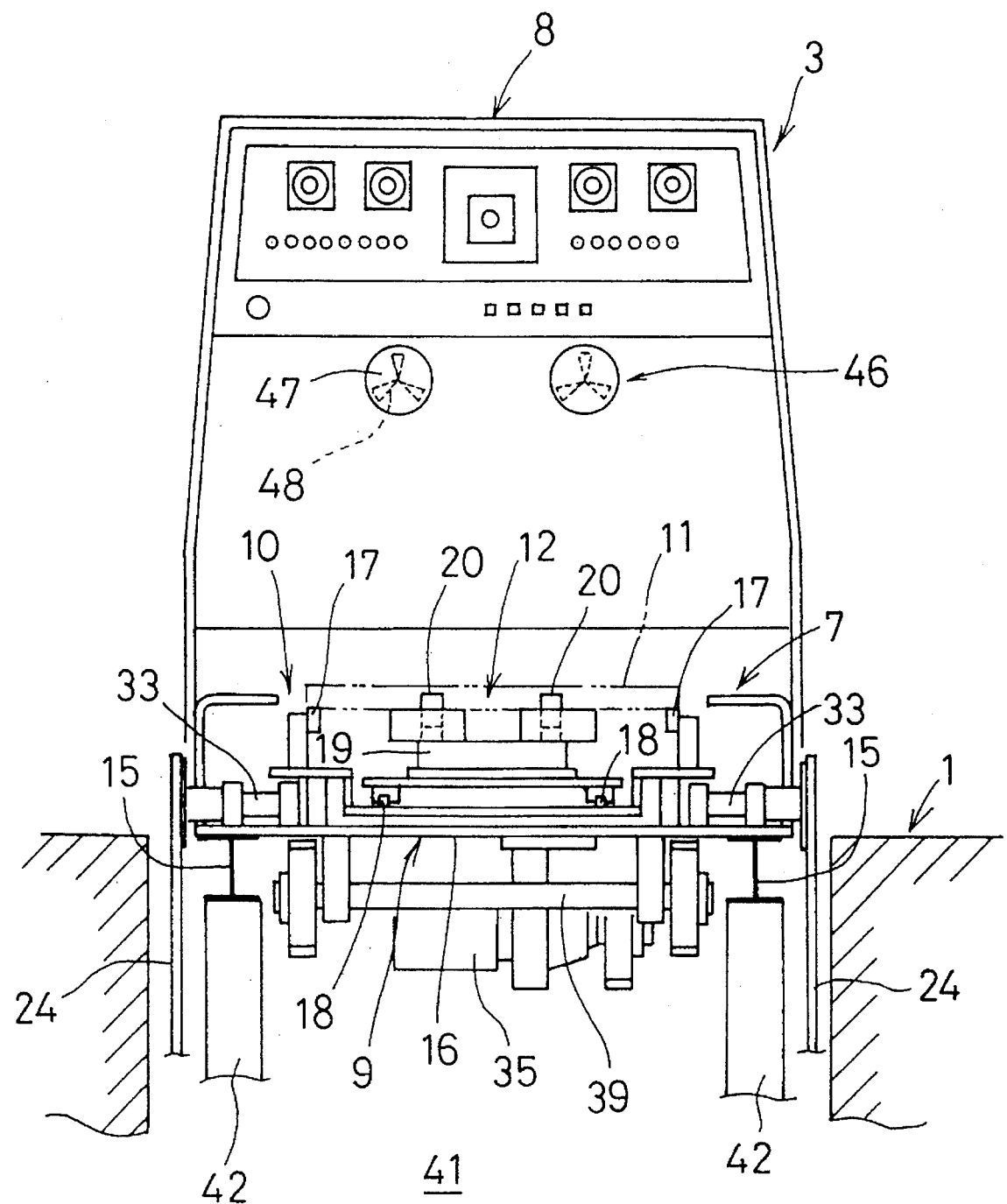
FIG. 4 is a view taken in the direction of arrow IV—IV in FIG. 3.

As shown in FIGS. 2 through 4, the tester 3 comprises an internal combustion engine support block 7, a controller 8 erected at the rear end of the internal combustion engine support block 7. The internal combustion engine support block 7 comprises a base frame 9 disposed in the upper region of the turntable 1, a free roller conveyor 10 disposed on the base frame 9, and an introducing device 12 for placing a pallet 11 onto said free roller conveyor 10. The base frame 9 comprises a pair of frame members 15 and a base plate extending between these frame members 15. The free roller conveyor 10 has a plurality of pairs of opposed free rollers 17. Further, the introducing device 12 is installed in the middle between the opposed free rollers 17 and comprises a movable body 19 adapted to move longitudinally as it is supported and guided by a pair of guide rails 18, and retractable locking pins 20 disposed on the movable body 19. The locking pins 20 are adapted to project above and into the movable body 19 by cylinder devices (not shown). The pallet 11 is formed with pin holes (not shown) for receiving said locking pins 20 when the latter are projected.

The controller 8 is in the form of a rectangular parallelepiped having approximately the same width as that of the internal combustion engine support block 7, and meters and an operating panel are installed on the front and lateral sides of said controller. The internal combustion engine 2 is supported on the pallet 11 through the support legs 21.

Figure 1:
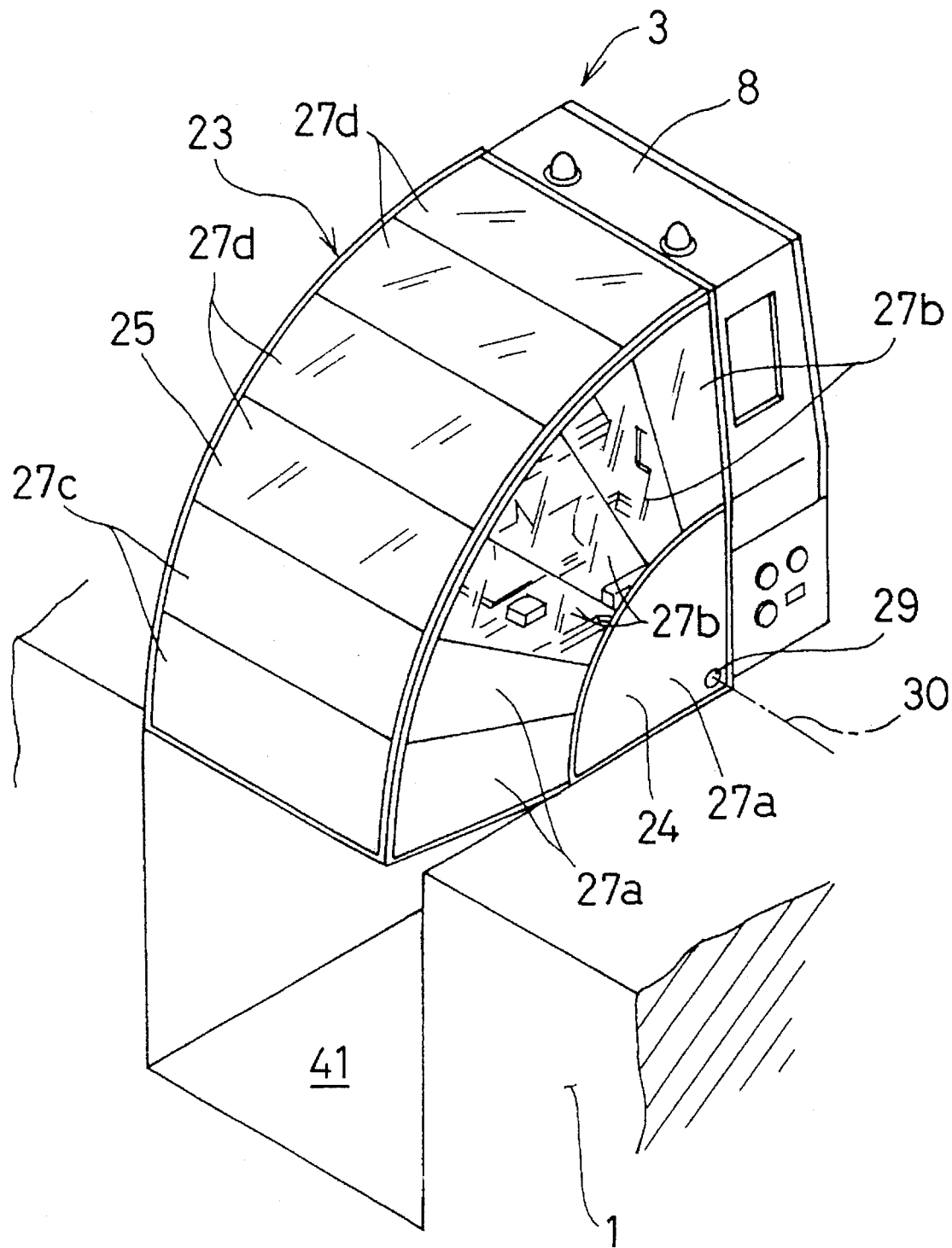
FIG. 1 is a perspective view showing the closed state of the cover of an internal combustion engine tester according to an embodiment of the invention.
Figure 5:
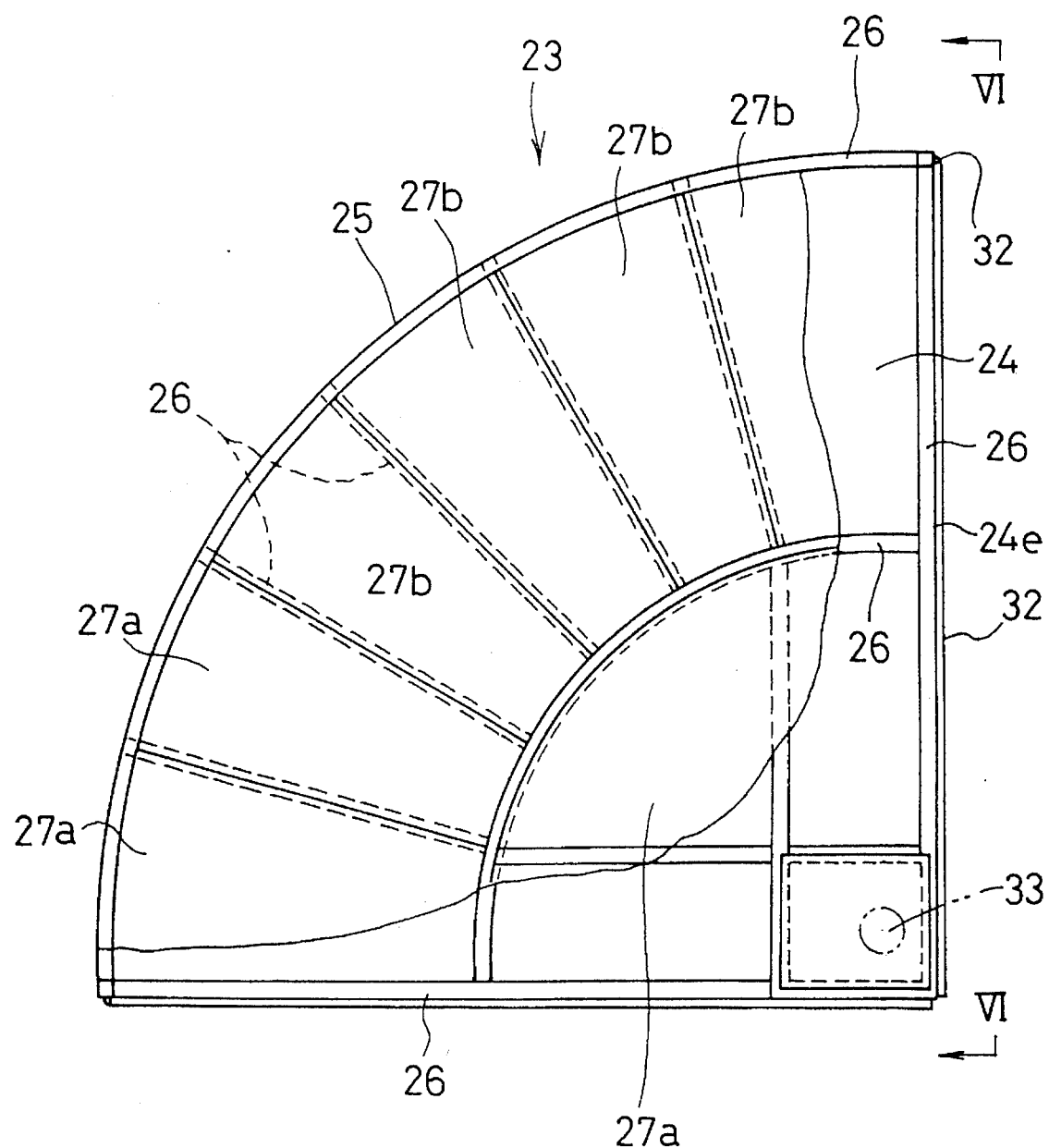
FIG. 5 is a side view of the cover.
Figure 6:
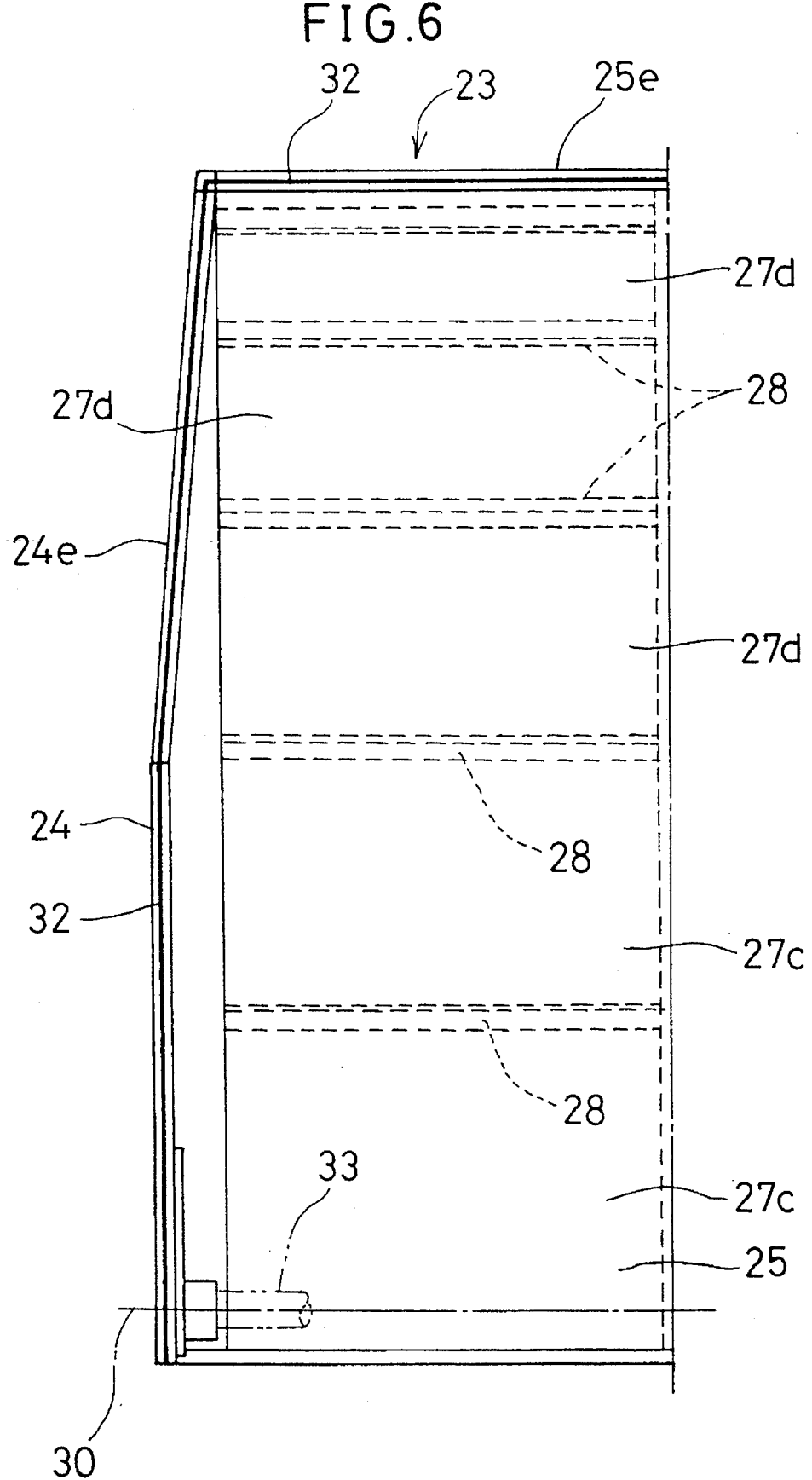
FIG. 6 is a view taken in the direction of arrow VI—VI in FIG. 5.

As shown in FIGS. 1, 5 and 6, a cover 23 comprises a pair of sectorial lateral plate assemblies 24 disposed on opposite sides of the internal combustion engine support block 7, and an arcuate outer plate assembly 25. Each sectorial lateral plate assembly 24 is formed of radial and circumferential cover frames 26 of stainless steel, and a plurality of cover plates 27a and 27b attached between these cover frames 26. The cover plates 27a of each sectorial lateral plate assembly 24 which are disposed on the pivot side and in the outer peripheral lower region are made of stainless steel, while the other cove, plates 27b are transparent, being made of plastic material or the like. Further, the arcuate outer plate assembly 25 comprises widthwise extending cover frames 28 of stainless steel, and a plurality of cover plates 27c and 27d attached between these cover frames 28. The lower cover plates 27c are made of stainless steel, while the other cover frames 27d are transparent, being made of plastic material or the like.

Figure 7:
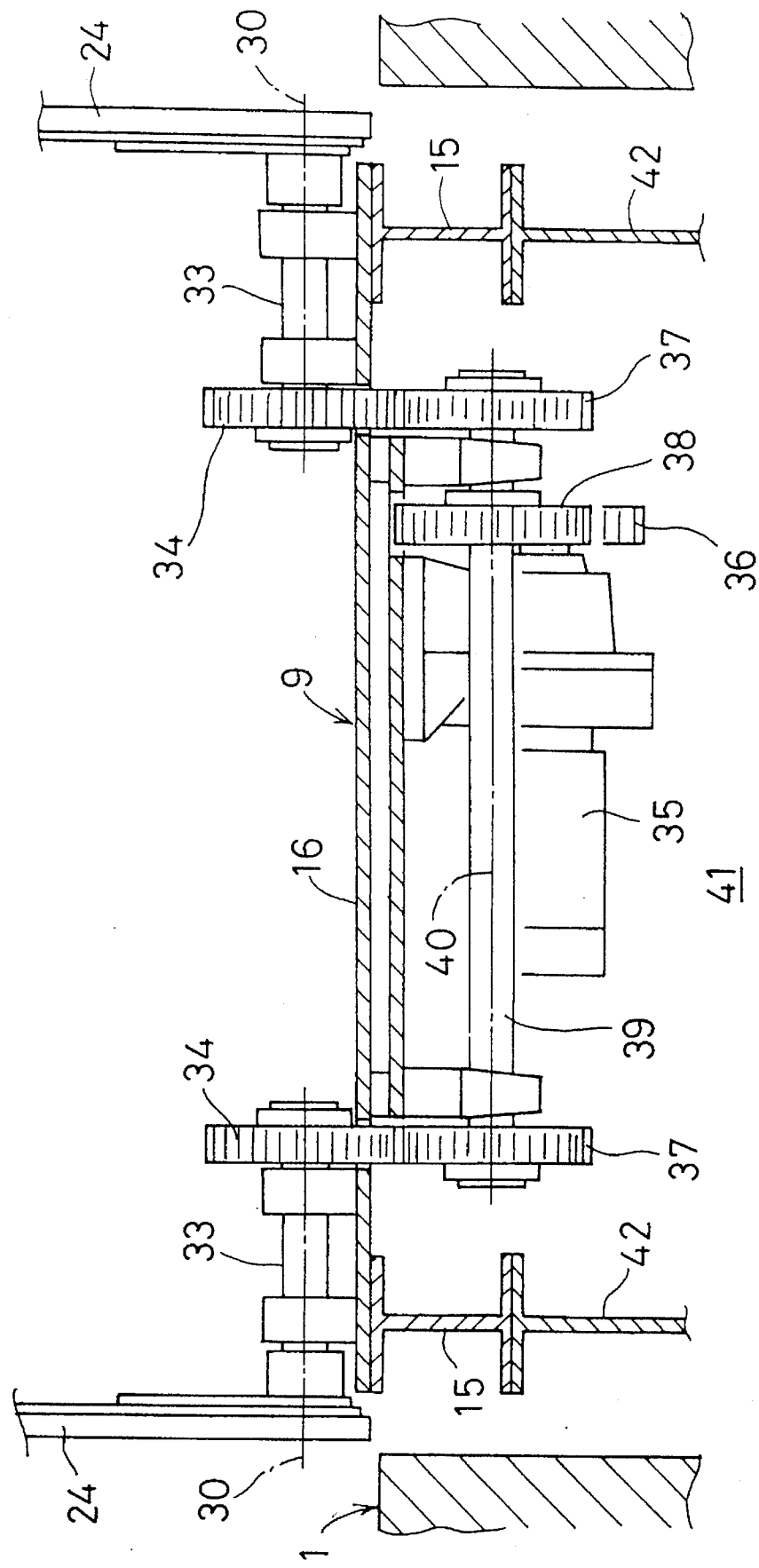
FIG. 7 is a front view showing a cover turning mechanism.

The cover 23 is turnable around widthwise extending axes 30, with its pivots at the inner edges of the sectorial lateral plate assemblies 24 serving as fulcrums 29. More particularly, as shown in FIG. 7, the pivots of the sectorial lateral plate assemblies 24 are fixedly fitted on the outer ends of a pair of rotary shafts 33. A first gear 34 is mounted on the inner end of each rotary shaft 33. Further, an electric motor 35 for turning the cover 23 is attached to the lower surface of the base plate 16, said electric motor 35 having a driving gear 36 mounted on its driving shaft. The rotary shafts 33 are operatively connected to the electric motor 35 through an operatively connecting rotary shaft 39 having second gears 37 meshing with the first gears 34 and a third gears 38 meshing with said driving gear 36. The rotatively connecting rotary shaft 39 is installed on the lower surface of the base plate 16 and is turnable around a widthwise extending axis 40. In addition, the opposite end surfaces of the cover 23 are open and the distance between the sectorial lateral plate assemblies 24 is greater than the width of the base frame 9.

In the illustrated case, the lateral plate assemblies 24 are sectorial, but they may be square, rectangular or otherwise shaped.

As shown in FIGS. 2 and 4, a pit 41 for maintenance of the piping and the like is formed under the internal combustion engine support block 7, and the cover 23 now opened is received in the pit 41, which is an example of cover receiving means. Support legs 42 for supporting said base frame 9 are installed in the pit 41.

As shown in FIGS. 5 and 6, tape-like contact switches 32, which are an example of detecting means, are bonded to the closing ends 24e and 25e of the sectorial lateral plate assemblies 24 and arcuate outer plate assembly of the cover 23 to extend throughout the length. If a foreign matter comes in contact with such contact switch 32 to turn on the latter, the electric motor will be brought to an emergency stop.

Figure 8:
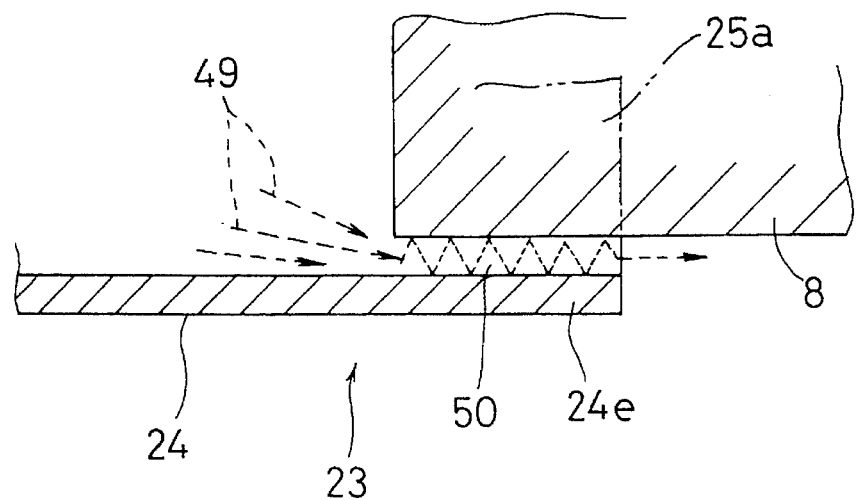
FIG. 8 is a cross-sectional view showing an overlap between the closing end of the cover and the controller.
Figure 9:
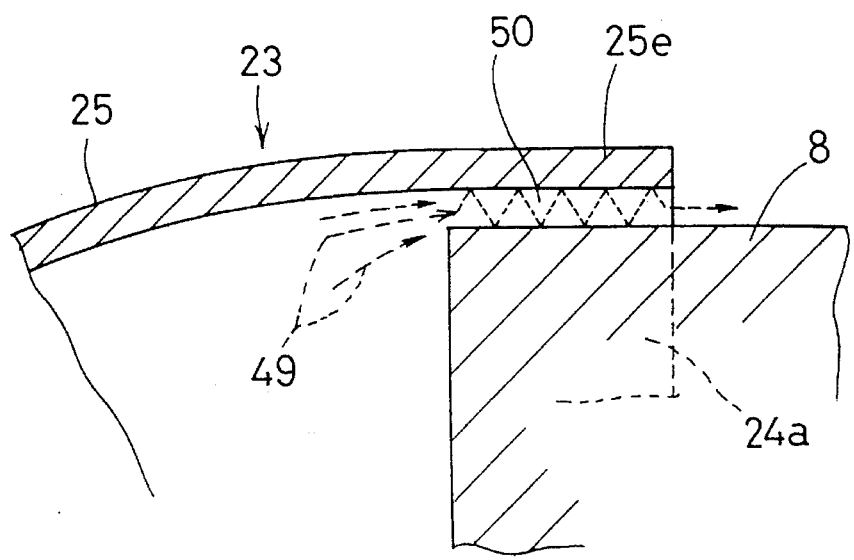
FIG. 9 is a side view, in longitudinal section, showing the overlap between the closing end of the cover and the controller.

As shown in FIGS. 8 and 9, when the cover 23 is closed, the closing ends 24e of the sectorial lateral plate assemblies 24 overlap the front end regions of the opposite sides of the controller 8, while the closing end 25e of the arcuate outer plate assembly 25 overlaps the upper front end region of the controller 8.

As shown in FIGS. 3 and 4, the controller 8 is provided with a ventilator 46 for ventilating the interior of the cover when the latter is closed. This ventilator 46 comprises a ventilating hole 47 communicating with the front and lower surfaces of the controller 8, and a ventilating fan 48.

The function of the above arrangement will now be described.

As shown in FIG. 10, internal combustion engines 2 are fed to the testers 3 through pallets 11 by the carrying-in device 4 and during intermittent rotation of the turntable 1, warming-up, idle adjustment and various tests are performed. In this case, as shown in FIG. 4, the introducing device 12 is advanced as it is supported and guided by the guide rails 18 and the locking pins 20 are upwardly projected into the pin holes (not shown) in the pallet 11. And the introducing device 12 is rearwardly moved and the pallet 11 is drawn from the carrying-in device onto the internal combustion engine support block 7 and supported thereon, whereby, as shown in FIG. 2, the internal combustion engine 2 is supported on the internal combustion engine support block 7 through the pallet 11. On completion of the test, the internal combustion engine 2 is taken out of the tester 3 by the carrying-out device 5.

When said test is started, as shown in FIG. 7, the electric motor 35 is driven and its rotation is transmitted to the rotary shafts 33 successively through the driving gear 36, third gear 38, second gears 37 and first gears 34. And the rotary shafts 33 are rotated in one direction around the widthwise extending axes 30 for closing movement, so that the cover 23 is rotated upwardly from within the pit 41 onto the internal combustion engine support block 7 with the pivots of the opposed sectorial lateral plate assemblies 24 serving as fulcrums 29, so that said assemblies move out of the pit 41 to overlie the internal combustion engine support block 7. Thereby, as shown in FIG. 1, the opposite sides of the internal combustion engine support block 7 are covered with the sectorial lateral plate assemblies 24 while its top is covered with the arcuate outer plate assembly 25. Further, the closing end of the cover 23 abuts against the front surface of the controller 8 and is thereby shut while the opening end of the cover 23 is shut by the internal combustion engine support block 7. Covering the internal combustion engine 2 in this manner effects sound proofing and dust proofing and maintains safety outside the cover 23 even if a trouble occurs in the internal combustion engine 2 since the latter is isolated from the outside by the cover 23.

As shown in FIGS. 5 and 6, during the closing rotation of the cover 23, if a foreign matter, such as a tool or the operator's hand, accidentally comes between the closing end 24e or 25e of the cover 23 and the controller 8, such foreign matter makes contact with the contact switch 32 to turn on the latter, thereby bringing the electric motor 35 to an emergency stop; thus, the foreign matter is prevented from being nipped between the closing end 24e or 25e of the cover 23 and the controller 8. In addition, contact switches 32 may be provided at the opening ends (opposite to the closing ends 24e and 25e of the cover 23.

As shown in FIG. 8 and 9, when the cover 23 is closed, the closing end 24e of each sectorial lateral plate assembly 24 overlap the front end of the lateral side of the controller 8, while the closing end 25e of the arcuate outer plate assembly 25 overlaps the front end of the upper surface of the controller 8. Therefore, the noise 49 in the cover 23 is fully decreased before it leaks out since it attenuates as it passes through the clearance 50 in such overlap region. Reversely, the outside noise is likewise prevented from entering the cover 23. Therefore, the need of providing sound proofing seal or the like on the closing ends 24e, 25e or the controller 8 is saved.

As shown in FIG. 1, since portions of the cover 20 are formed of cover plates 27b and 27d, the internal combustion engine 2 can be seen from the outside. Thus, if a trouble occurs in the internal combustion engine 2 during test, the operator can quickly know and cope with it. Further, making the other cover plates 27a, 27c and cover frames 26 (FIG. 5) and 28 (FIG. 6) of stainless steel provides sufficient strength and improved corrosion resistance.

Further, as shown in FIG. 3, ventilation of the closed cover 23 can be effected through the ventilation hole 47 by driving the ventilation fan 48 during test. Therefore, the heat collected in the cover 3 can be discharged for temperature control and it is possible to prevent exhaust gases from being stored in the cover 23.

Upon completion of test, the electric motor 35 is reversed to cause the rotary shafts 33 to turn for opening movement in the opposite direction around the widthwise extending axes 30, so that the cover 23 is rotated around the pivots of the sectorial outer plate assemblies 24 serving as fulcrums 29, from above the internal combustion engine support block 7 into the pit 41. Thus, as shown in FIG. 2, the cover 23 is opened, received in the pit 41.

Thereby, the internal combustion engine support block 7 can be covered by the rotary type cover 23 alone without using a fixed cover and it has become unnecessary to provide an opening space which corresponds in length and width to the cover 23 at the back of the internal combustion engine support block 7; therefore, the installation space for the internal combustion engine tester 3 can be reduced in the longitudinal direction. Further, receiving the cover 23 in the pit 41 prevents it from being left laterally of the internal combustion engine support block 7 to interfere with operation. In addition, forming the cover 23 of a pair of sectorial lateral plate assemblies and an arcuate outer plate assembly disposed between the outer edges of said sectorial outer plate assemblies makes it possible to form the cover in compact form.

In the above embodiment, the cover 23 has been received in the pit 41 with its form intact; however, the cover may be received in the pit 41 in its folded form.

Figure 11:
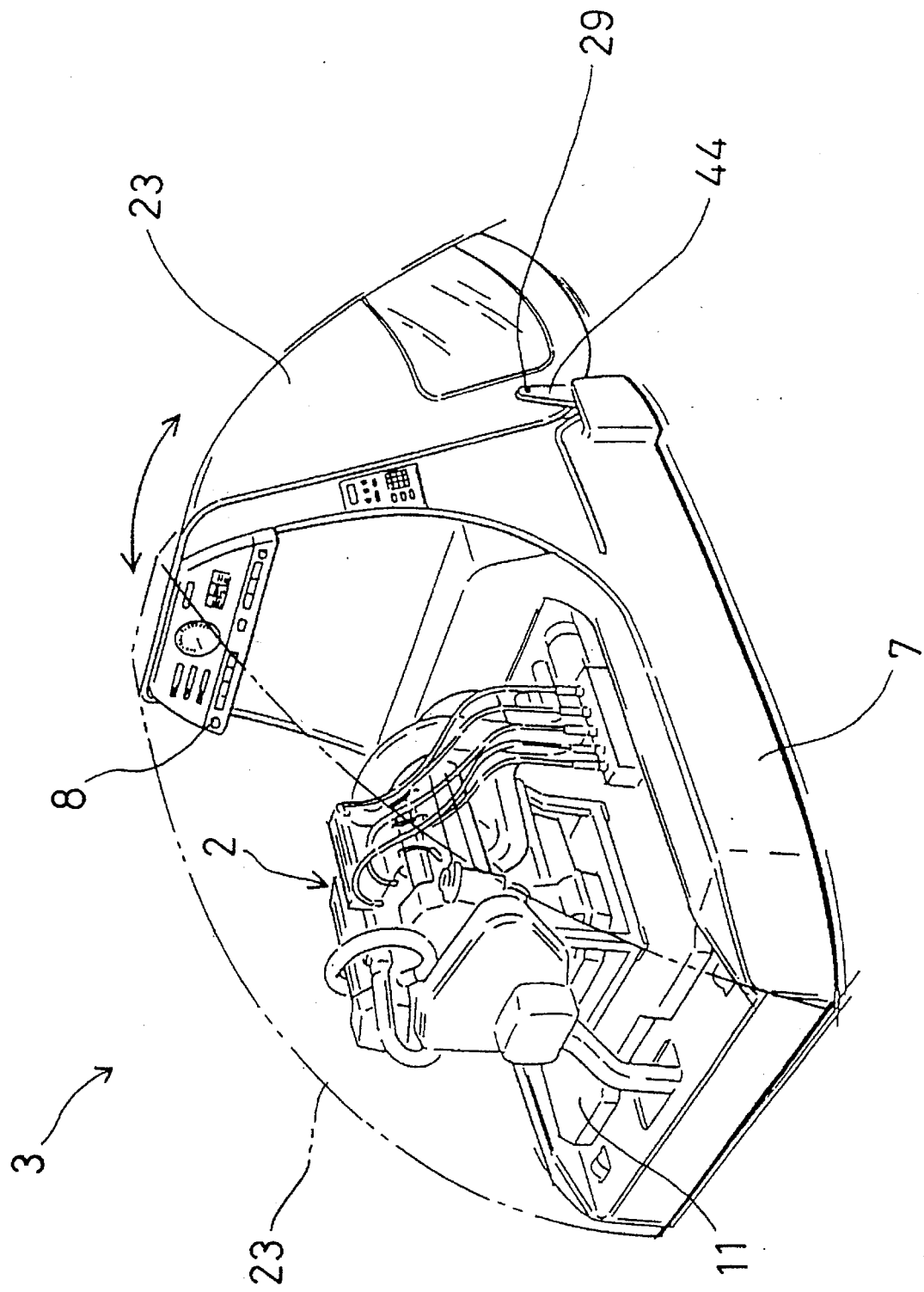
FIG. 11 is a perspective view of an internal combustion engine tester having a rearwardly opened type cover for an internal combustion engine tester.

Further, in the above embodiment, the cover 23 is opened by turning it forwardly of the controller 8; however, as shown in FIG. 11, the cover 23 may be of the type in which it is opened by turning it rearwardly of the controller 8. In this case, the fulcrums 29 of the cover 23 are connected to the rotary shafts associated with the internal combustion engine support block 7 through link mechanisms 44 (see the rotary shafts 33 in FIG. 7). With this arrangement, the cover is once pulled up and then turned rearwardly.

Figure 12:
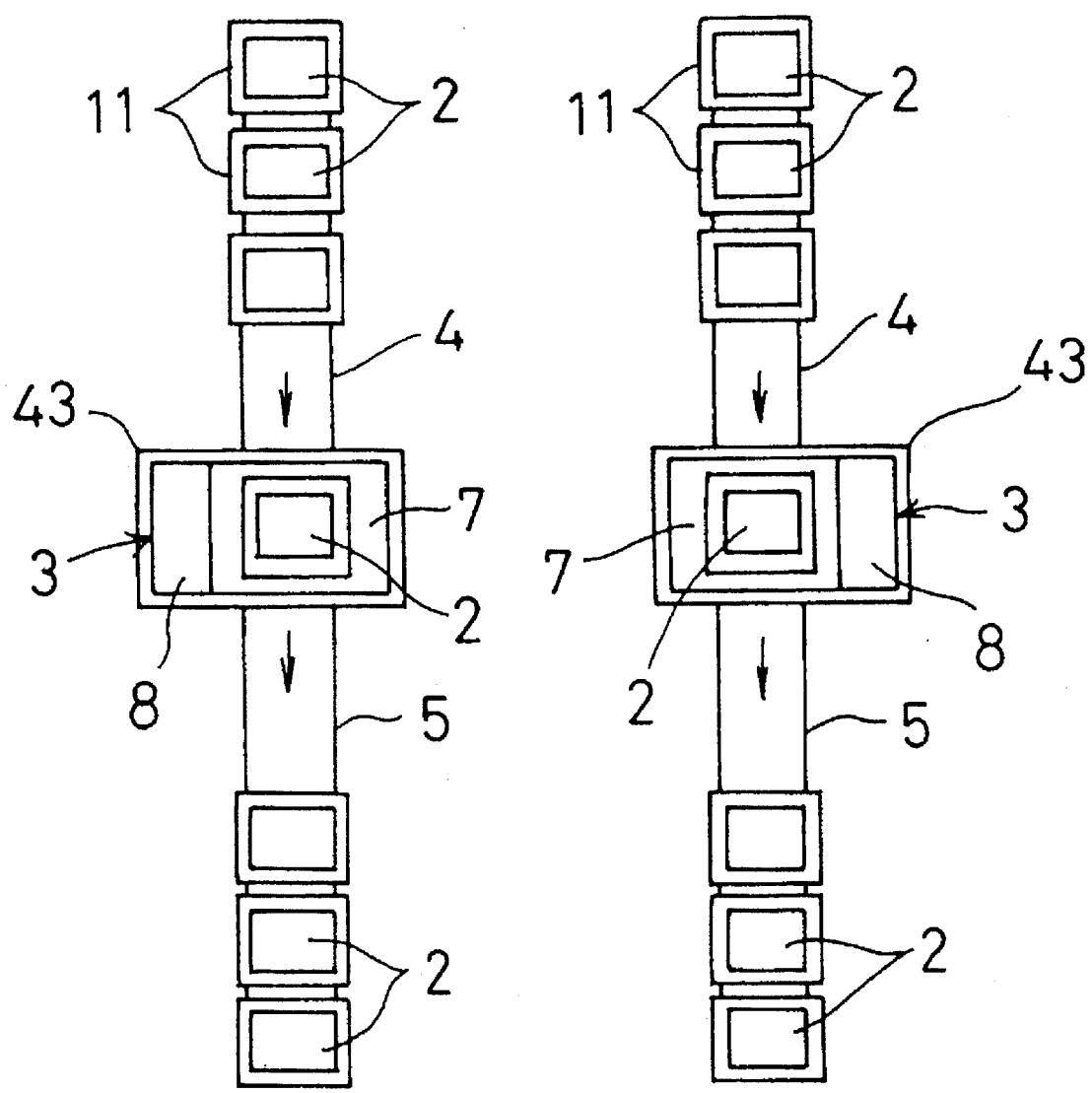
FIG. 12 is a plan view showing the disposition of internal combustion engine testers.

Another embodiment of the invention will now be described with reference to FIG. 12.

The numeral 43 denotes a plurality of fixed base blocks, each base block 43 having a tester 3 and a pit 41. A carrying-in device 4 is installed upstream of each base block 43 and a carrying-out device 5 is installed on the downstream side. According to this arrangement, an internal combustion engine 2 fed to the tester 3 from the upstream side by the carrying-in device 4 is taken out of the tester 3 to the downstream side by the carrying-out device 5.

Figure 13:
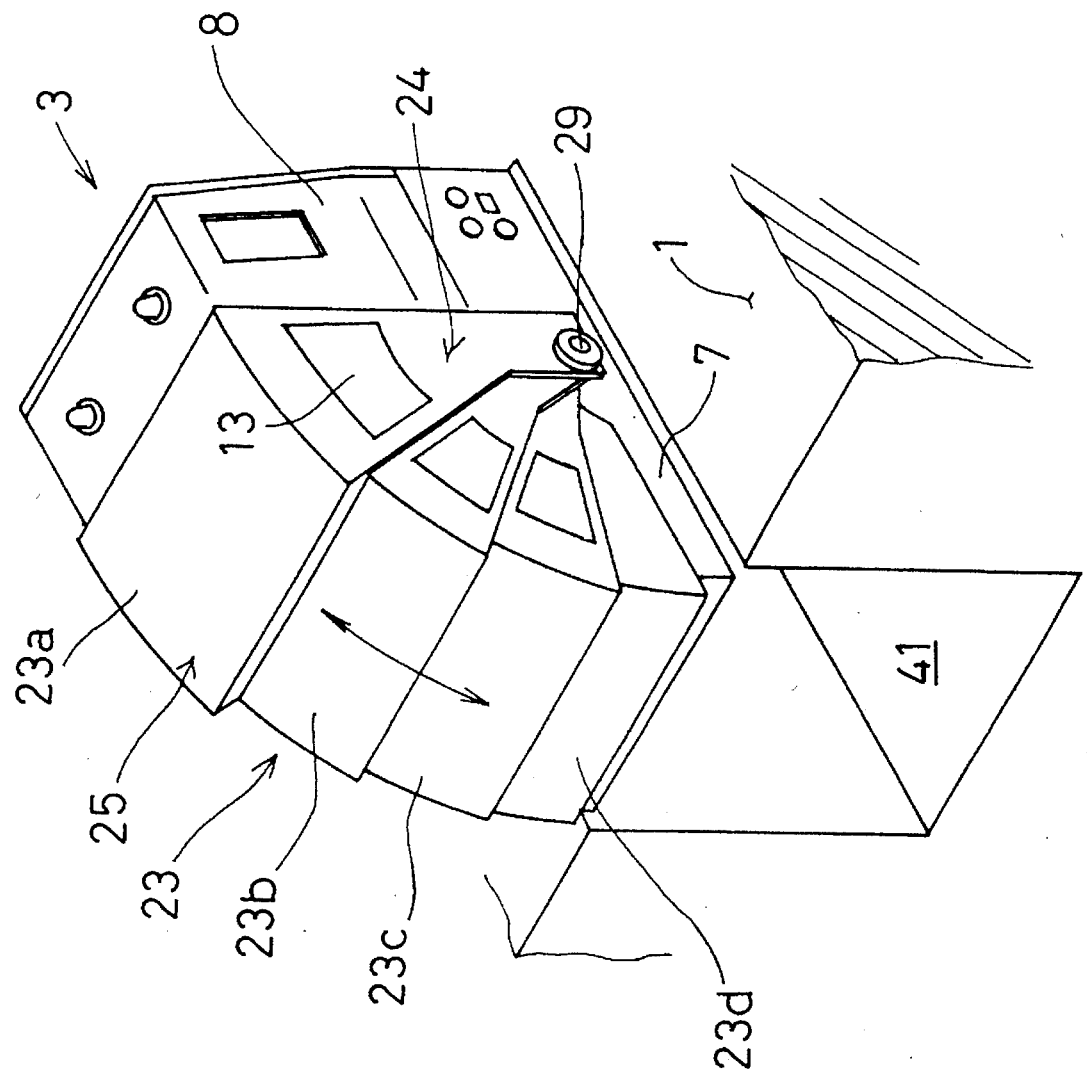
FIG. 13 is a perspective view of an internal combustion engine tester with a multistage foldable type cover in an embodiment of the invention.
Figure 14:
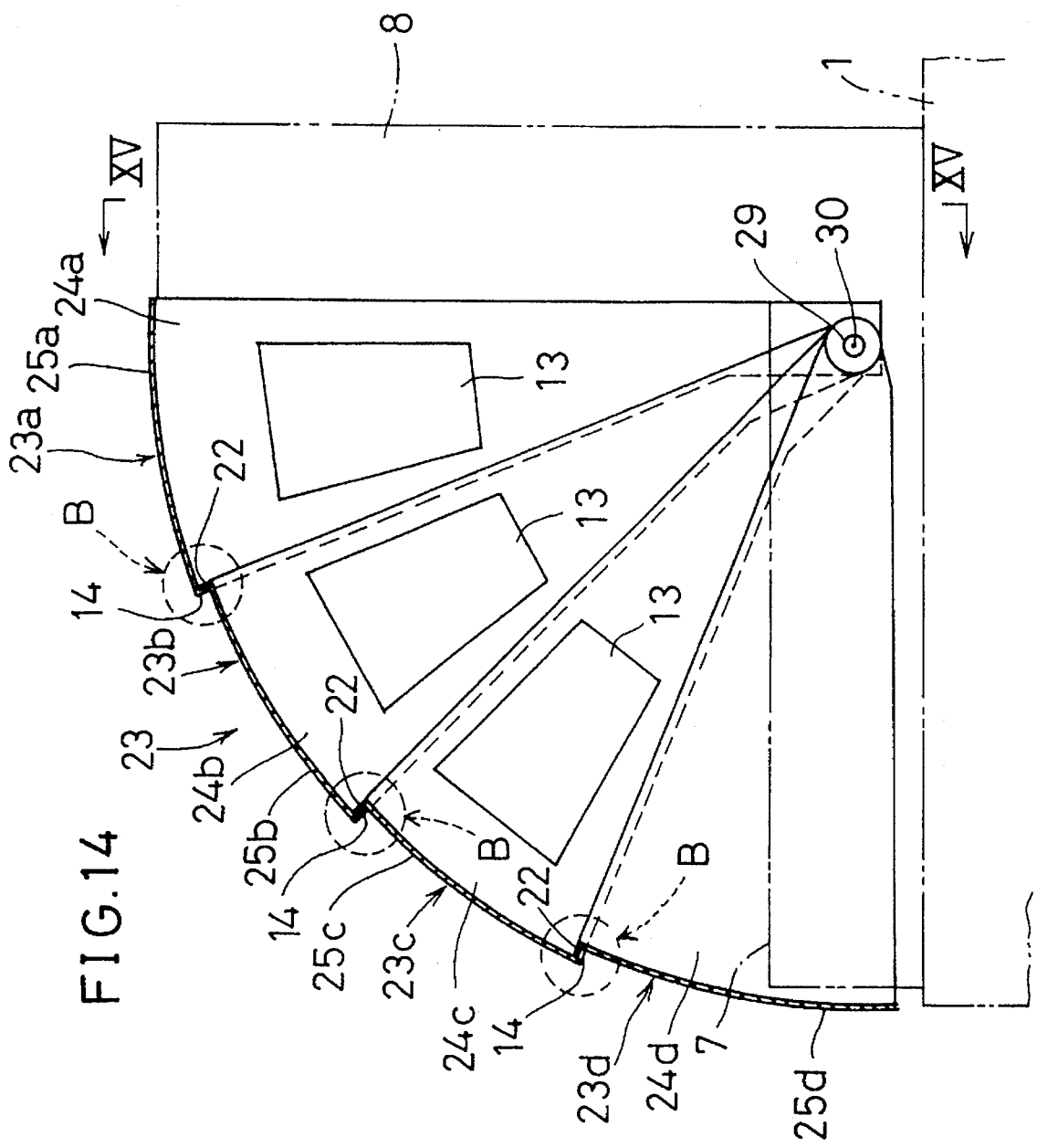
FIG. 14 is a side view, in longitudinal section, of the multistage foldable type cover.
Figure 15:
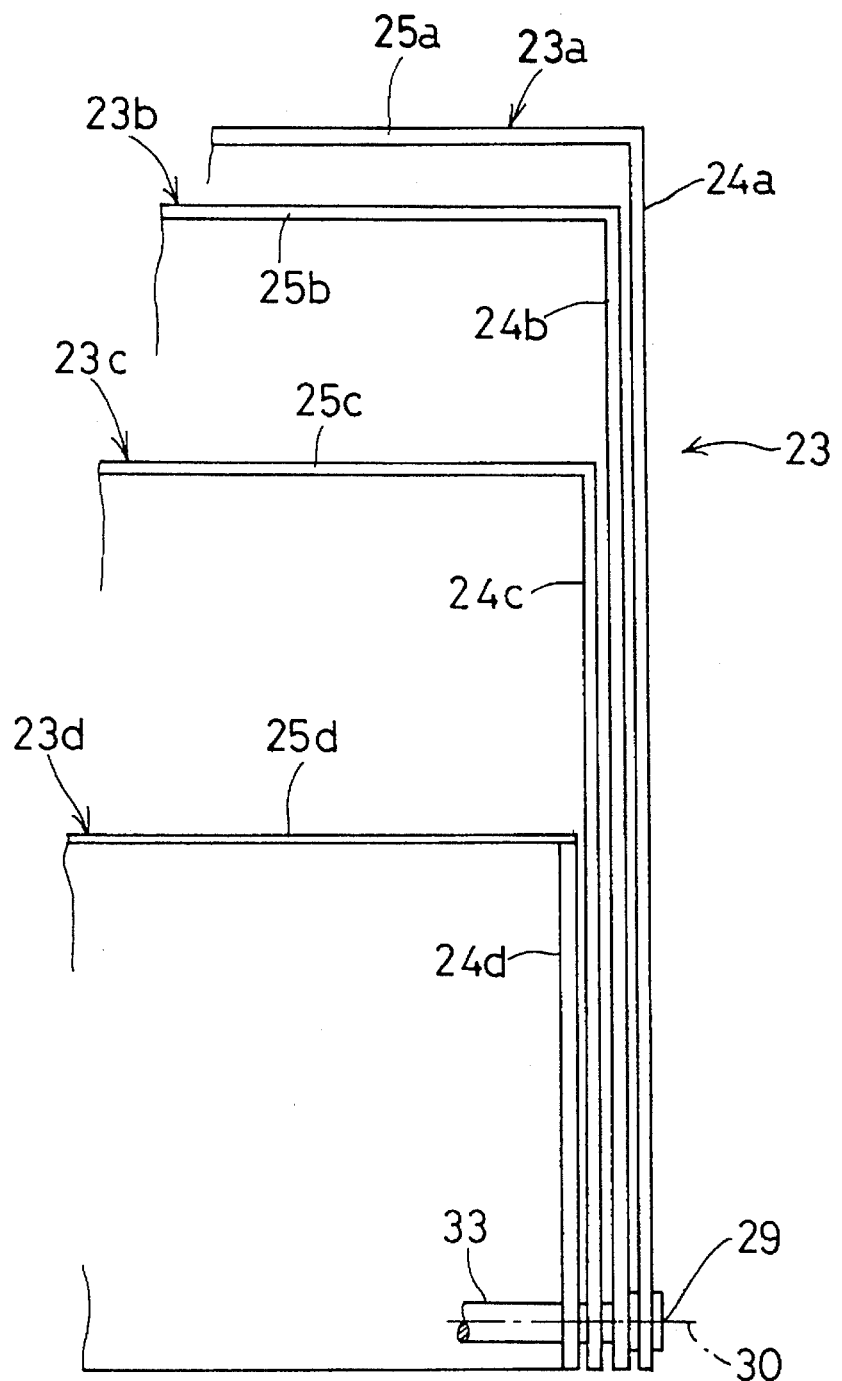
FIG. 15 is a view taken in the direction of arrow XV—XV in FIG. 14.

The second object of the present invention can be achieved by an embodiment shown in FIGS. 13 through 15. In FIGS. 13 through 15, a cover 23 is of the multistage foldable type, divided into four parts, ranging from the first stage cover portion 23a disposed on the opening side to the fourth stage cover portion 23d disposed on the closing side. These cover portions 23a through 23d comprise one-fourth divisional small lateral plates 24a through 24d and one-fourth divisional small outer plates 25a through 25d. The small lateral plates 24a through 24c are each formed with a window 13 covered with a transparent plate, such as of plastic material.

Figure 16:
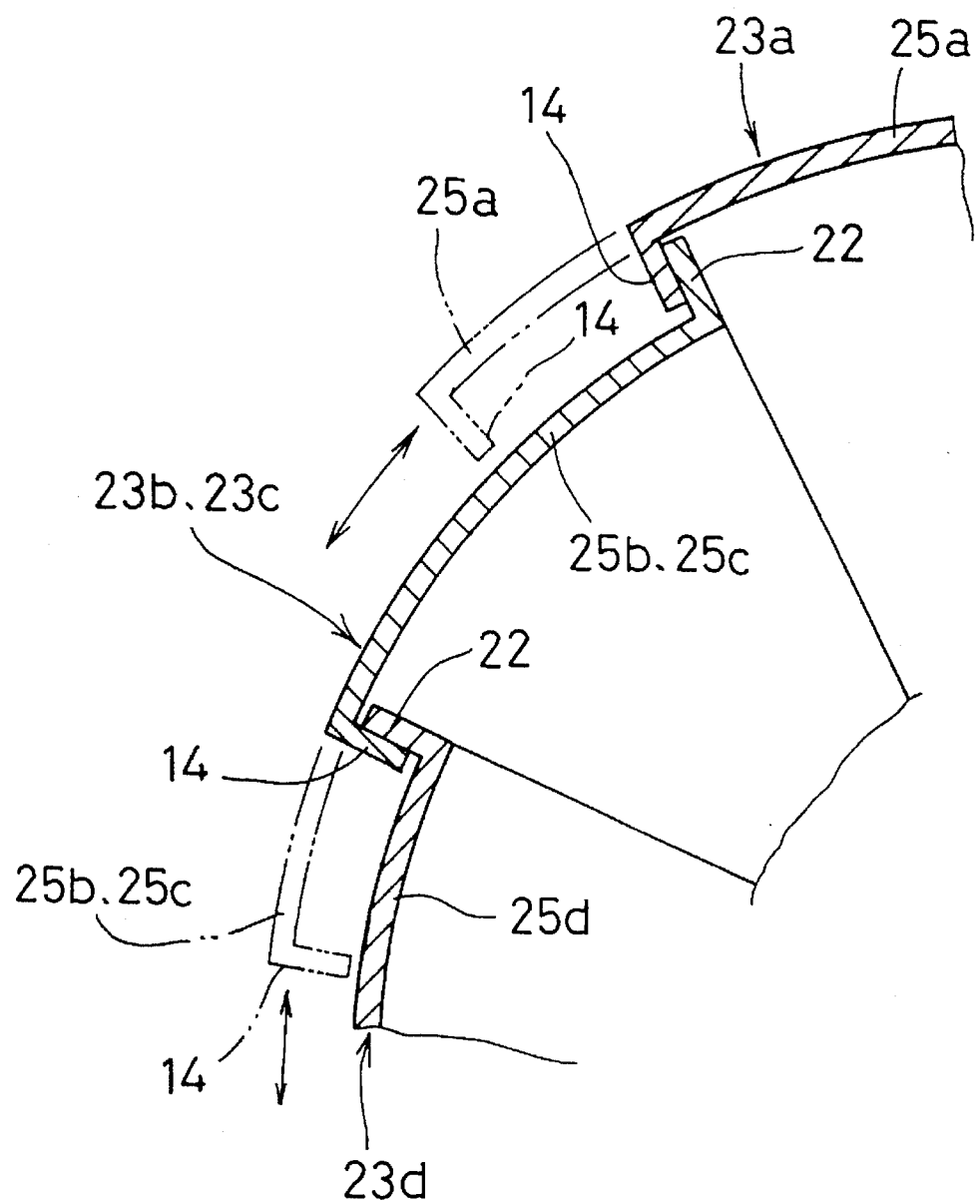
FIG. 16 is an enlarged view of an area B in FIG. 14.

The cover 23 is turnable around widthwise extending axes 30 with the pivots at the inner edges of the small lateral plates 24a through 24d serving as the fulcrums 29 and is foldable in the turning direction. More particularly, the first stage cover portion 23a is the greatest in the distance between the lateral surfaces and in radius, followed by the second stage cover portion 23b, the third stage cover portion 24c and the fourth stage cover portion 24d in the decreasing order. Further, as shown in FIG. 16, the opening ends of the small outer plates 25a through 25c are each formed with a locking tooth 14 bent toward the widthwise extending axes 30. Further, the closing ends of the small outer plates 25b through 25d are each formed with a locked tooth 22 engageable with the locking tooth 14. Thereby, the cover 23 can be folded with the first stage cover portion 23a positioned on the outermost side and the fourth stage cover portion 23d positioned on the innermost side.

Figure 17:
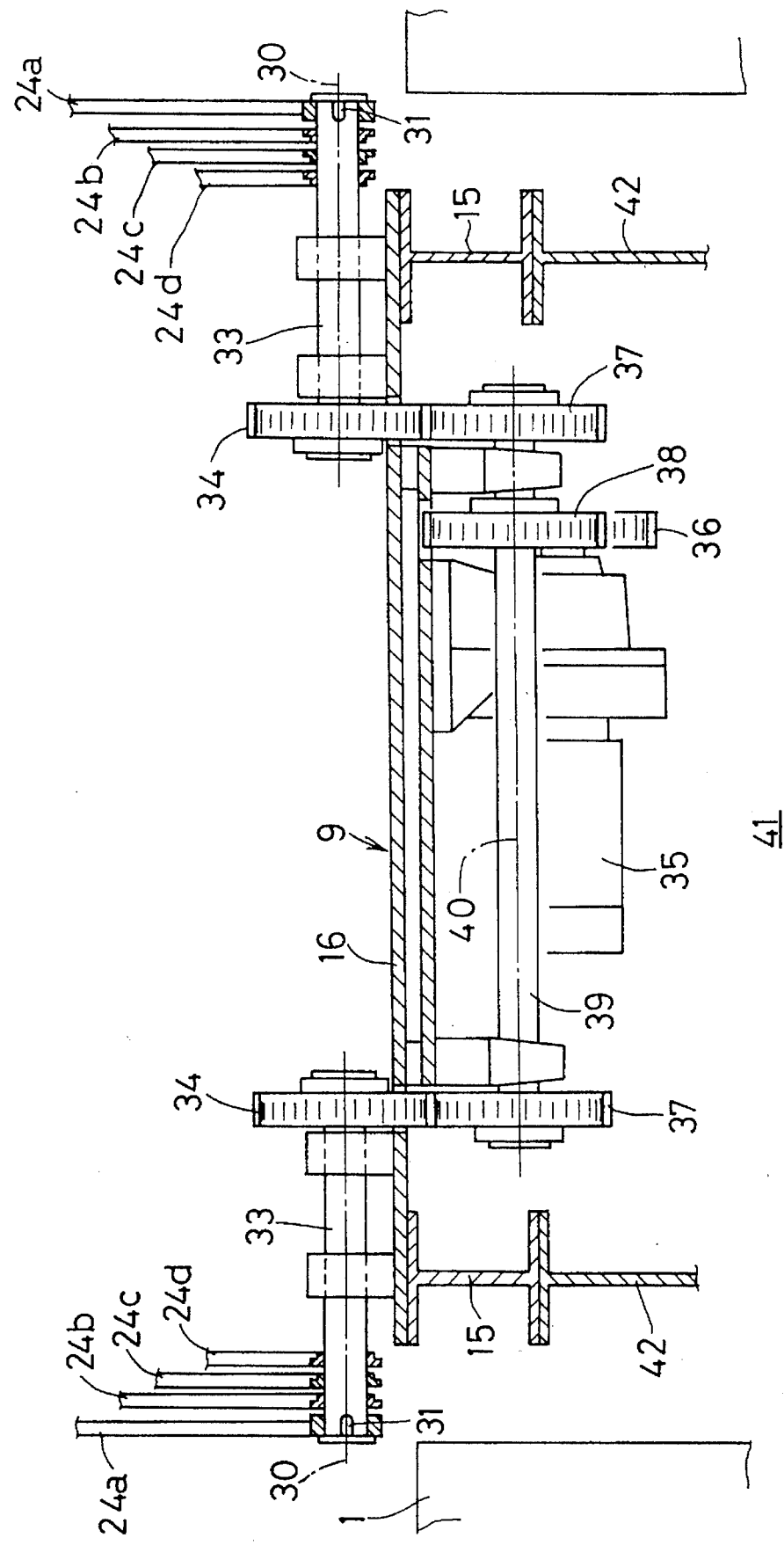
FIG. 17 is a front view showing the multistage foldable type cover.

As shown in FIG. 17, the pivots of the small lateral plates 24a through 24d are turnably fitted on the outer ends of the pair of rotary shafts 33 turnably supported above the base frame 9. The opposed small lateral plates 24a alone positioned on the outermost side are operatively connected to the rotary shafts 33 by keys 31. A first gear 34 is mounted on the inner end of each rotary shaft 33. An electric motor 35 for turning the first stage cover portion 23a is attached to the lower surface of the base plate 16, and a driving gear 36 is mounted on the driving shaft of said electric motor 35. The rotary shafts 33 are operatively connected to the electric motor 35 through an operatively connecting rotary shaft 39 having second gears 37 meshing with the first gears 34, and a third gear 38 meshing with said driving gear 36. The operatively connecting rotary shaft 39 is installed on the lower surface of the base plate 16 and is turnable around the widthwise extending axis 40.

Figure 18:
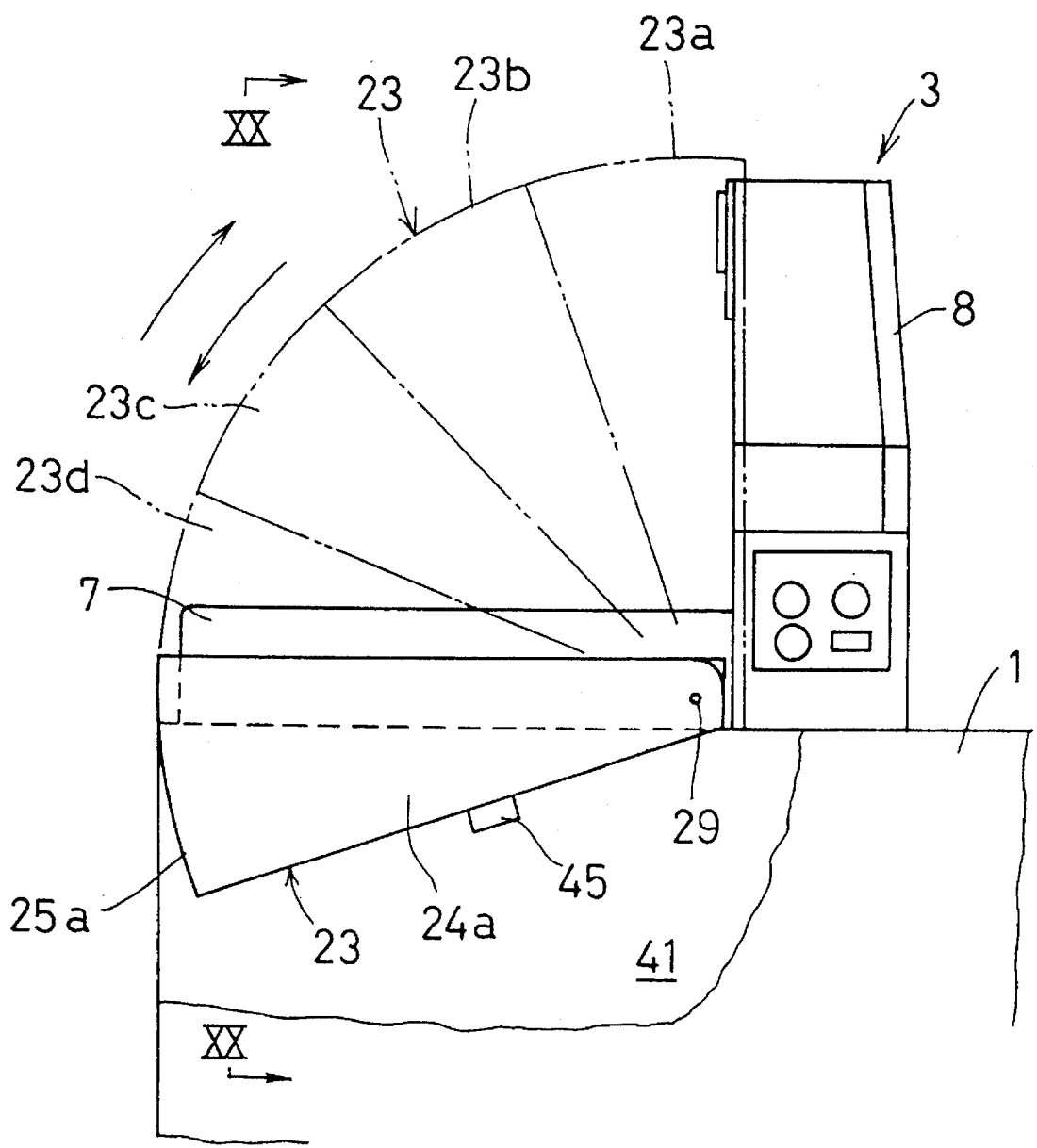
FIG. 18 a side view, partly broken away, of the internal combustion engine tester.
Figure 19:
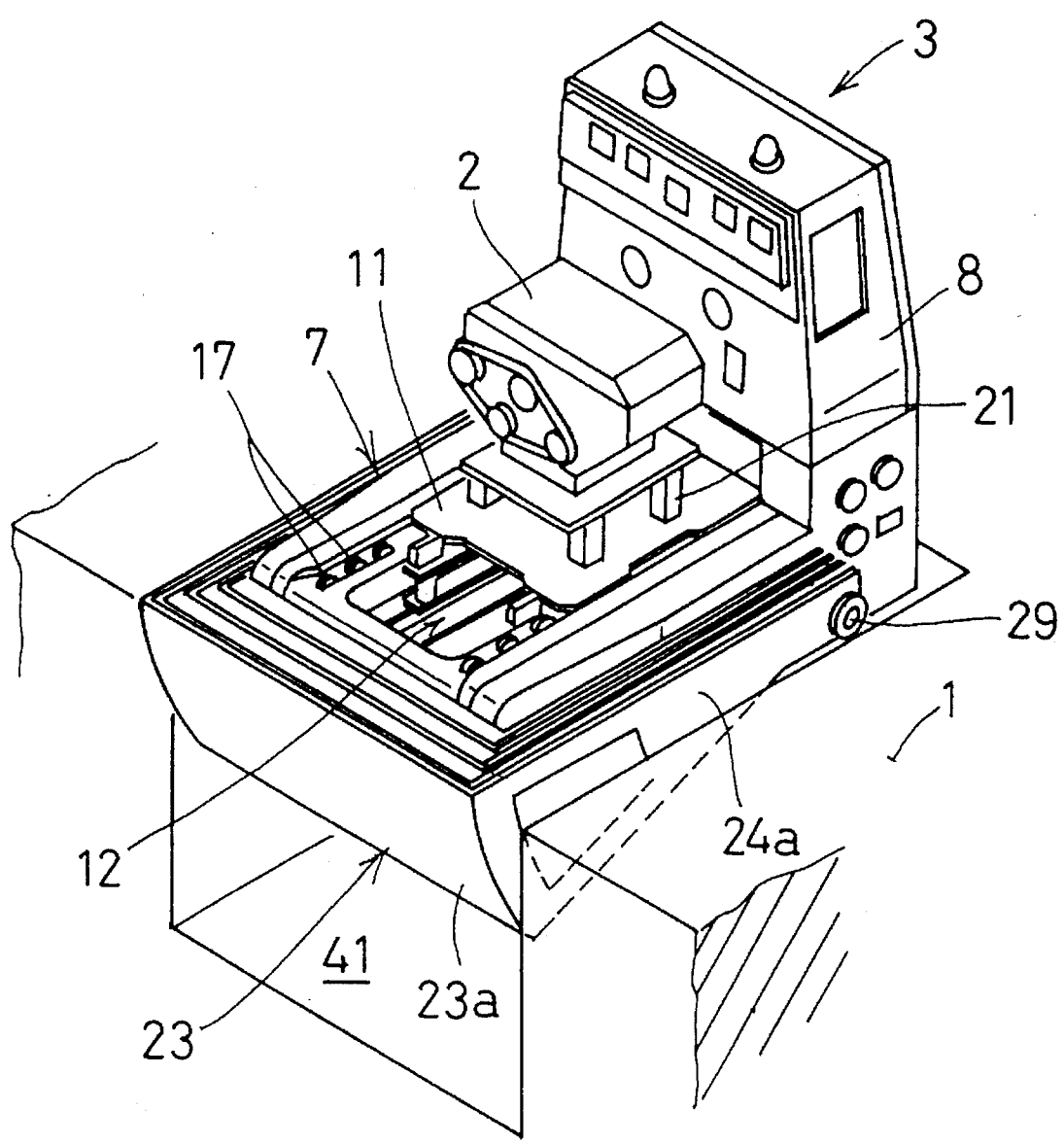
FIG. 19 is a perspective view of the internal combustion engine tester with the multistage foldable type cover being opened.
Figure 20:
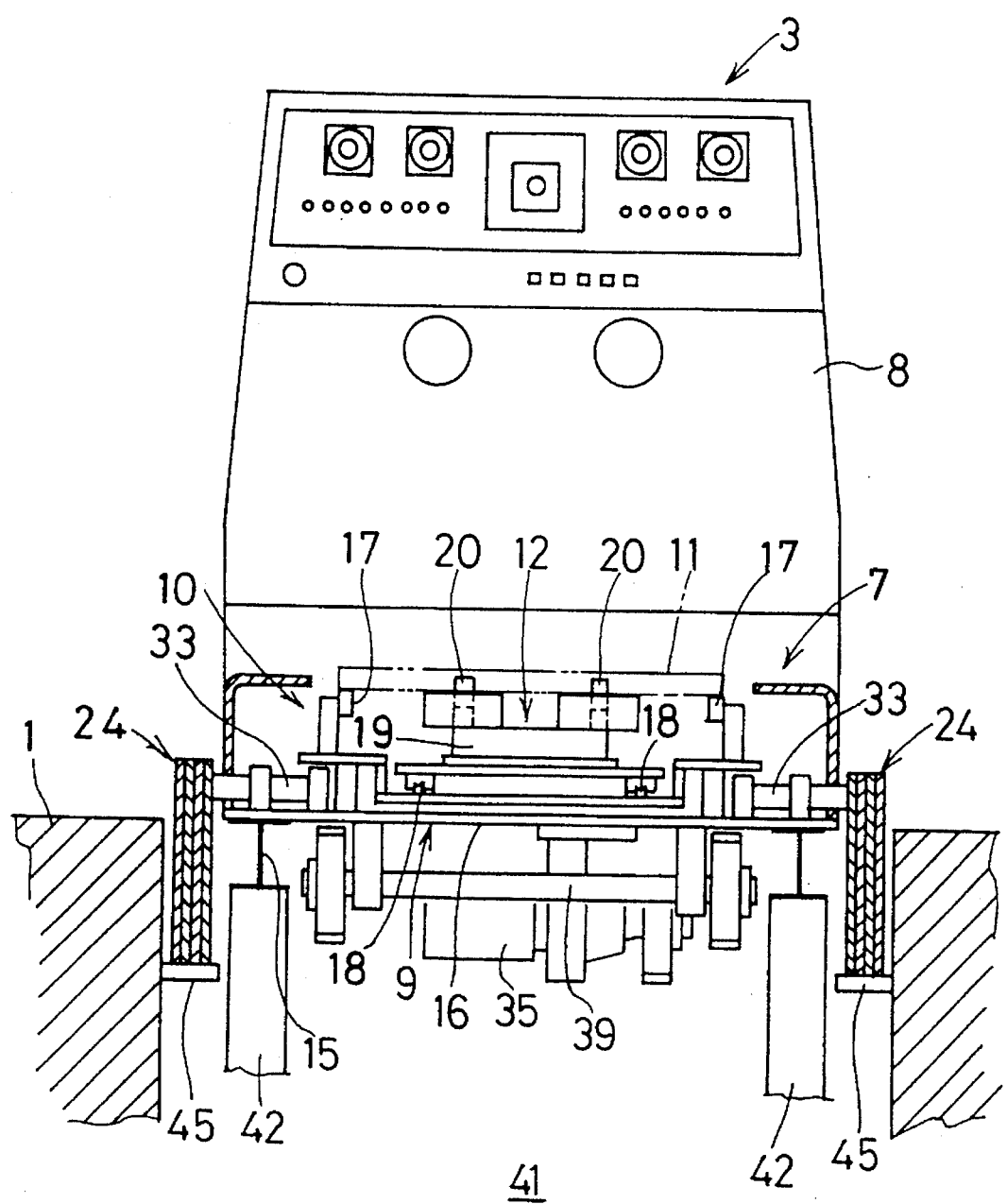
FIG. 20 is view taken in the direction of arrow XX—XX in FIG. 18.

As shown in FIGS. 18 through 20, a pit 41 for maintenance of the piping and the like is formed under the internal combustion engine support block 7, and the cover 23 now folded is received in said pit 41. Attached to the opposed inner surfaces of the pit 41 are stops 45 adapted to abut against the lower ends of the small lateral plates 24a through 24d of the folded cover 23. Support legs 42 for supporting the base frame 9 are installed in the pit 41.

The function of the above arrangement will now be described.

When a test on an internal combustion engine 2 is started, as shown in FIG. 17, the electric motor 35 is driven and its rotation is transmitted to the rotary shafts 33 successively through the driving gear 36, third gear 38, second gears 37 and first gears 34. And the rotary shafts 33 are rotated in one direction around the widthwise extending axes 30 for opening movement. Thus, since the opposed small lateral plates 24a are turned together with the rotary shafts 33, the first stage cover portion 23 is turned in one direction (toward the pit 41). At this time, as shown in in phantom lines in FIG. 16, since the tooth 14 of the first stage cover portion 23b is separated from the locked tooth 22 of the second stage cover portion 23b, the second stage cover portion 23b is turned in one direction under its own weight around the widthwise extending axes 30. As in the case of said second stage cover portion 23b, the locking teeth of 14 are separated from the locked teeth 22, whereby the third and fourth stage cover portions 23c and 23d are turned in one direction under their own weight around the widthwise extending axes 30. In this manner, the second through fourth stage cover portions 23b through 23d are folded and contracted in operative association with the first stage cover portion 23a, whereby the cover 23 is opened as shown in FIGS. 19 and 20, received in the pit 41 in its folded form with the first stage cover portion 23a positioned on the outermost side and the fourth stage cover portion 23d positioned on the innermost side. In this case, as shown in solid lines in FIG. 18, since the lower ends of the cover portions 23a through 23d abut against the stop 45 and are thereby supported, the turning of the cover portions 23a through 23d is stopped by the stop 45.

Since the cover 23 is received in its folded form in the pit 41 in this manner when the cover 23 is opened, the space taken up by the cover 23 is reduced, making it possible to secure a sufficiently large maintenance space in the pit 41.

When it is desired to close the cover 23, the electric motor 35 is reversed to rotate the rotary shafts 33 in the other direction around the widthwise extending axes 30 for closing operation. Thus, since the opposed small lateral plates 24a are turned together with the rotary shafts 33, the first stage cover portion 24a is turned in the other direction (toward the controller 8). At this time, as shown in solid lines in FIG. 16, the locking tooth 14 of the first stage cover portion 23a engages the locked tooth 22 of the second stage cover portion 23b, so that the second stage cover portion 23b is also turned in the other direction around the widthwise extending axes 30. Like the second stage cover portion 23b, the third and fourth stage cover portions 23c and 23d are turned in the other direction around the widthwise extending axes 30 because of each locking tooth 14 engaging the associated locked tooth 22. As a result of the second through fourth stage cover portions 23b through 23d being unfolded in operative association with the first stage cover portion 23a in this manner, the cover 23 is closed as shown in FIGS. 13 and 14, covering the internal combustion engine support block 7 from above. Thus, the cover 23 effects sound proofing and dust proofing during test and maintains safety outside the cover 23 even if a trouble occurs in the internal combustion engine 2 since the latter is isolated from the outside by the cover 23.

In the above embodiment, the cover 23 has been divided into four parts, the first through fourth stage cover portions 23a through 23d; however, the invention is not limited to the division into four parts but the division into a plurality of parts is possible. Further, in the above embodiment, internal combustion engine testers 3 have been arranged circumferentially on the turntable 1; however, they may be arranged linearly on a plurality of or single fixing block.

Figure 21:
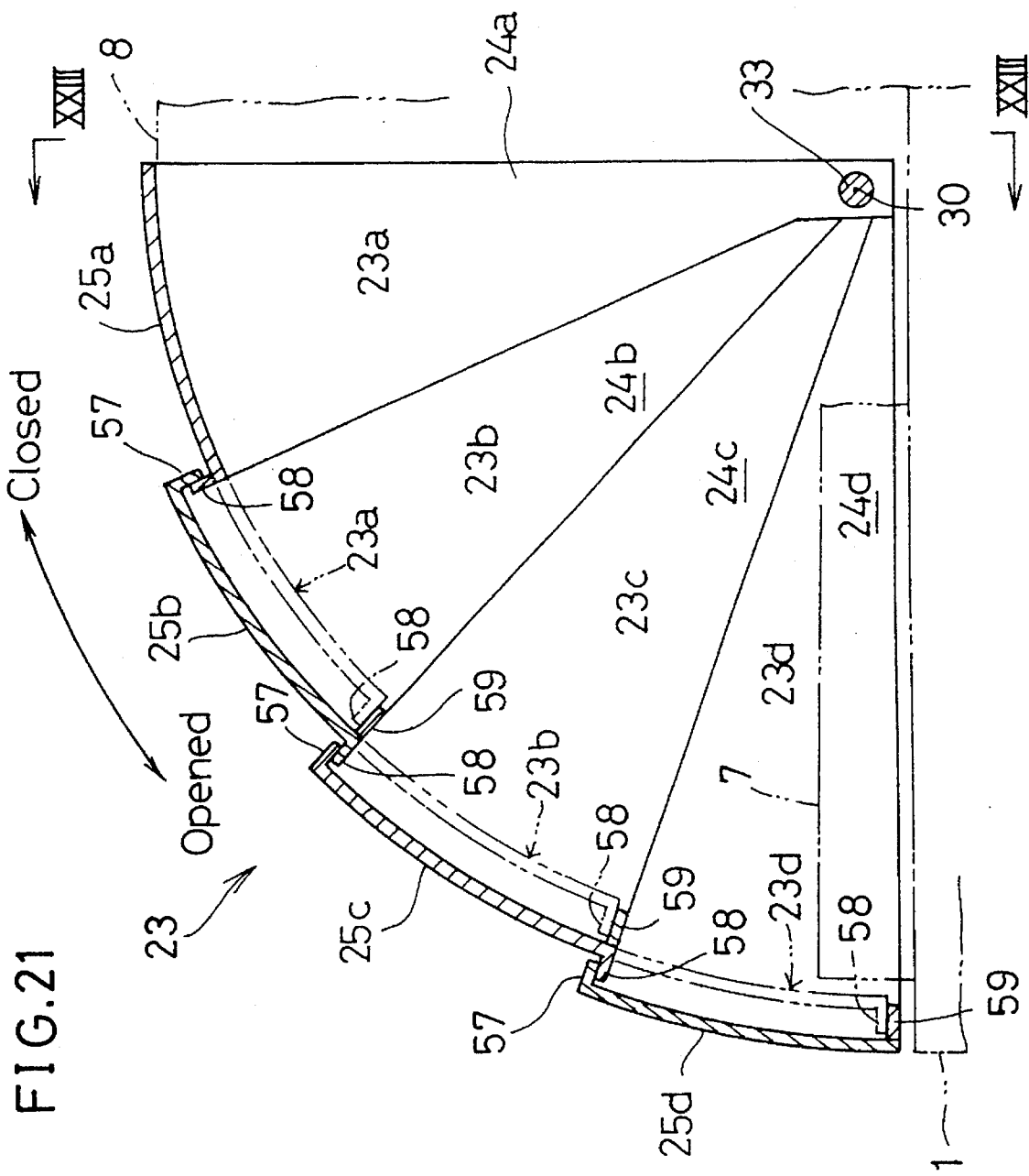
FIG. 21 is a side view, in longitudinal section, of a cover in another embodiment of the invention.

The second object of the invention can be achieved also by an embodiment shown in FIGS. 21 through 27. In the embodiment shown in FIGS. 21 through 27, the firs divisional cover portion 23a is the smallest in the distance between the lateral surfaces and in radius, followed by the second, third and fourth stage cover portions 23b, 23c and 23d in the increasing order. Further, as shown in FIG. 21, the closing ends of the divisional cover portions 23b through 23d are each formed with an inwardly bent engaged tooth 57. The opening ends of the divisional cover portions 23a through 23c are each formed with a first engaging tooth 58 (an example of the first engaging portion) adapted to engage the associated one of the engaged teeth 57 of the adjacent divisional cover portions 23b through 23d during closing movement.

Further, the opening ends of the divisional cover portions 23b through 23d are each formed with a second engaging tooth 59 (an example of a second engaging portion) bent inwardly to engage the associated one of the first engaging teeth 58 of the adjacent divisional cover portions 23a through 23c during opening movement.

As shown in FIG. 2–4, the pivots of the small lateral plates 24a through 24d are turnably fitted on the outer ends of the pair of rotary shafts 33 turnably mounted on the base frame 9. The opposed small lateral plates 24a disposed on the innermost site alone are operatively connected to the rotary shafts 33 by joint keys 31. Each rotary shaft 33 is provided at its inner end with a first gear 34. An electric motor 35 for turning the first divisional cover portion 23a is attached to the lower surface of the base plate 16 and has a driving gear 36 mounted on its driving shaft. The opposed rotary shafts 33 are operatively connected to the electric motor 35 through an operatively connecting rotary shaft 39 having second gears 37 meshing with the first gears 34, and a third gear 38 meshing with said driving gear 36. The operatively connecting rotary shaft 39 is installed on the lower surface of the base plate 16 and is turnable around the widthwise extending axis 40.

The function of the arrangement will now be described.

Figure 24:
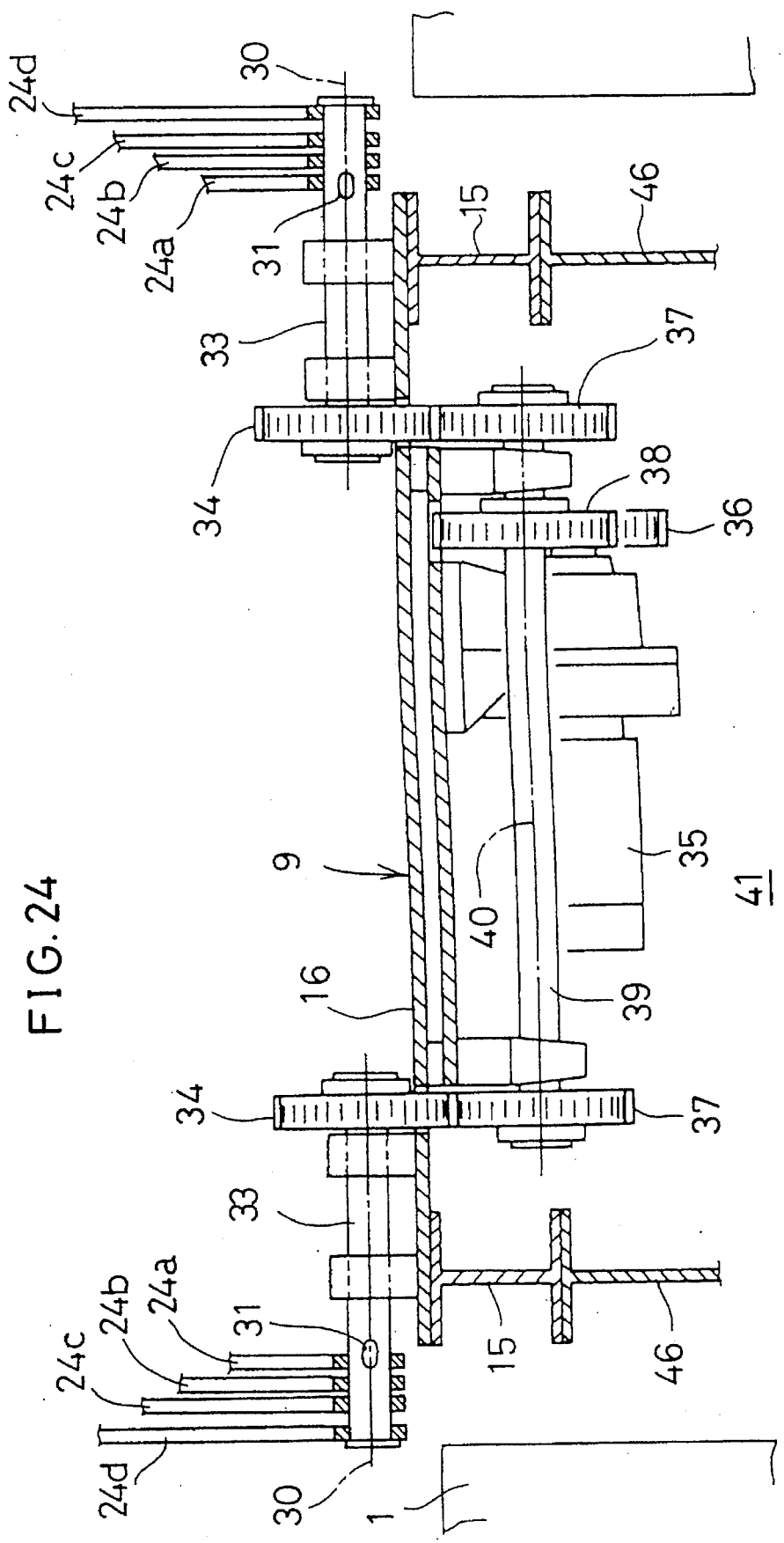
FIG. 24 is a front view showing a cover turning mechanism.

When a test on an internal combustion engine 2 is started, as shown in FIG. 24, the electric motor 35 is driven and its rotation is transmitted to the rotary shafts 33 successively through the driving gear 36, third gear 38, second gears 37 and first gears 34. And the rotary shafts 33 are rotated in one direction around the widthwise extending axes 30 for opening movement. Thus, since the opposed small lateral plates 24a are turned together with the rotary shafts 33, the first divisional cover portion 23a is turned in the opening direction (toward the pit 41) as shown in FIG. 21. At this time, as shown in in phantom lines in FIG. 21, since the first engaging tooth 58 of the first divisional portion 23a is separated from the engaged tooth 57 of the second divisional cover portion 23b and then engages the second engaging tooth 59 of the second divisional cover portion 23b to forcibly turn the second divisional cover portion 23b in the opening direction (toward the pit 41). Similarly, the first engaging tooth of 58 of the second divisional cover portion 23b engages the second engaging tooth 59 of the third divisional cover portion 23c to forcibly turn the third divisional cover portion 23c in the opening direction (toward the pit 41) while the first engaging tooth 58 of the third divisional cover portion 23c engages the second engaging tooth 59 of the fourth divisional cover portion 23d to forcibly turn the fourth divisional cover portion 23d in the opening direction (toward the pit 41).

Since the cover 23 is received in the pit 41 in its folded form in this manner when the cover 23 is opened, the space taken up by the cover 23 is reduced, making it possible to secure a sufficiently large maintenance space in the pit 41. Further, since the first and second engaging teeth engage each other to forcibly turn the adjacent divisional cover portions 23b through 23d in the opening direction (toward the pit 41), the cover can be reliably opened.

Figure 22:
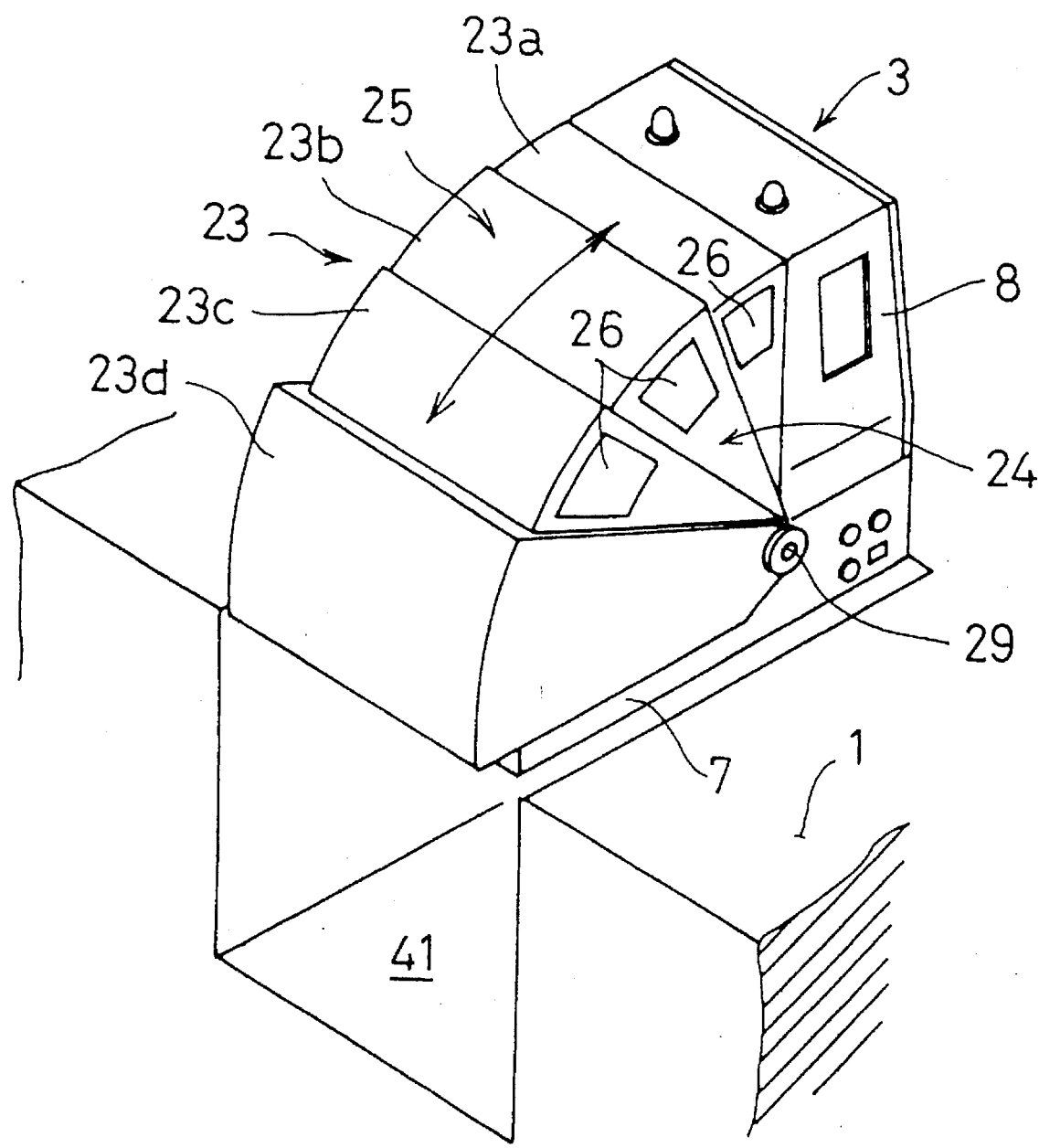
FIG. 22 is a perspective view showing the internal combustion engine tester when the cover is closed.
Figure 23:
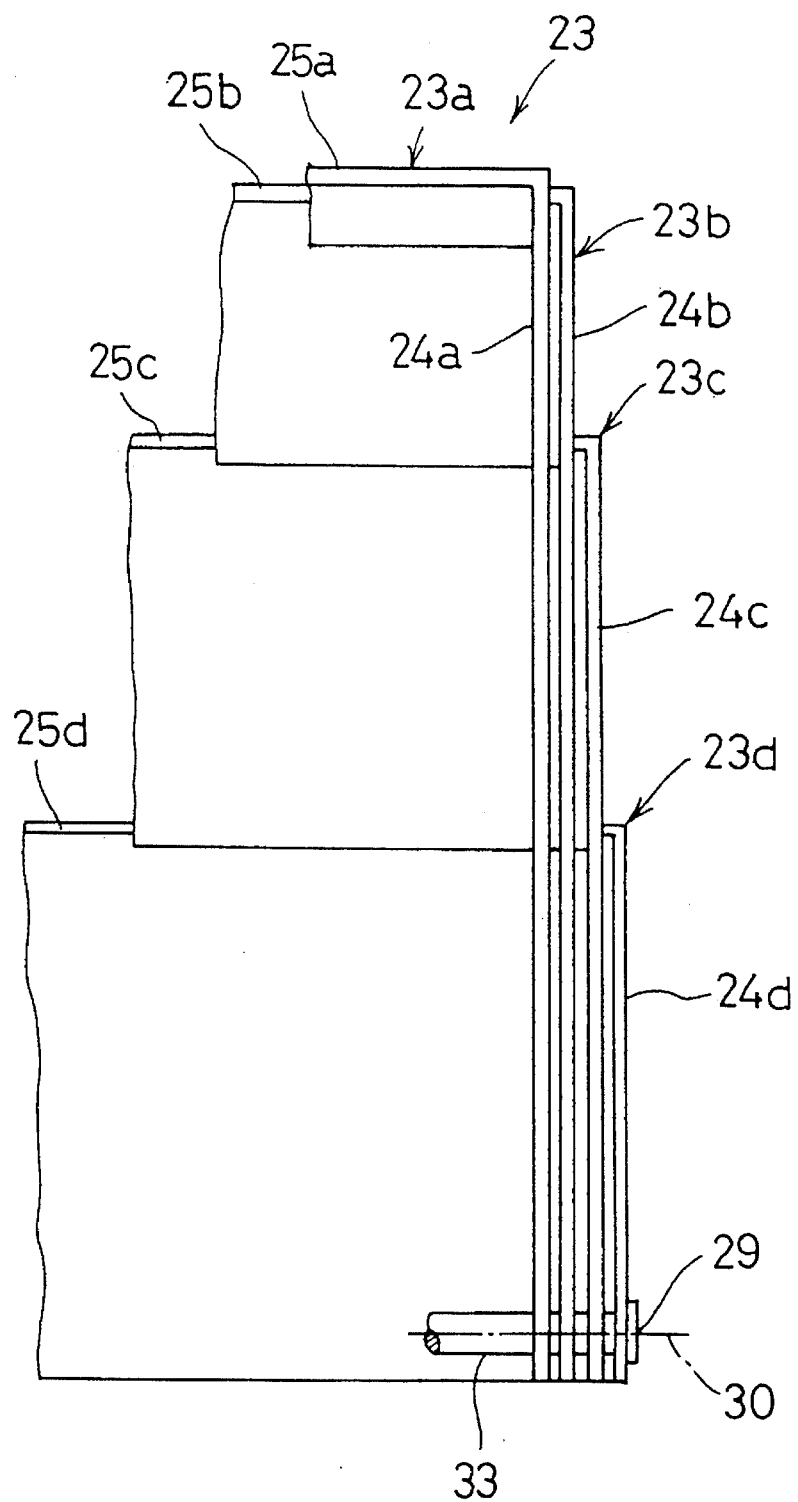
FIG. 23 is a view taken in the direction of arrow XXIII—XXIII in FIG. 21.

When it is desired, to close the cover 23, the electric motor 35 is reversed to turn the rotary shafts 33 in the other direction around the widthwise extending axes 30 for closing operation. Thus, since the opposed small lateral plates 24a are turned together with the rotary shafts 33, the first divisional cover portion 23a is turned in the closing direction (toward the controller 8) as shown in FIG. 21. At this time, as shown in solid lines in FIG. 21, the engaging tooth 58 of the first divisional cover portion 23a engages the engaged tooth 57 of the second divisional cover portion 23b, so that the second divisional cover portion 23b is also turned in the closing direction around the widthwise extending axes 30. Like the second divisional cover portion 23b, the third and fourth divisional cover portions 23c and 23d are turned in the closing direction around the widthwise extending axes 30 because of each first engaging tooth 58 engaging the associated engaged tooth 57. As a result of the second through fourth divisional cover portions 23b through 23d being unfolded in operative association with the first divisional cover portion 23a in this manner, the cover 23 is reliably closed as shown in FIG. 22, covering the internal combustion engine support block 7 from above. Thus, the cover 23 effects sound proofing and dust proofing during test and maintains safety outside the cover 23 even if a trouble occurs in the internal combustion engine 2 since the latter is isolated from the outside by the cover 23.

Another embodiment of the present invention will now be described with reference to FIG. 25.

The closing ends of the divisional cover portions 23a through 23c are each formed with a second engaging tooth 59 bent outwardly to engage the associated one of the engaged teeth 57 of the adjacent divisional cover portions 23b through 23d during opening movement.

Figure 25:
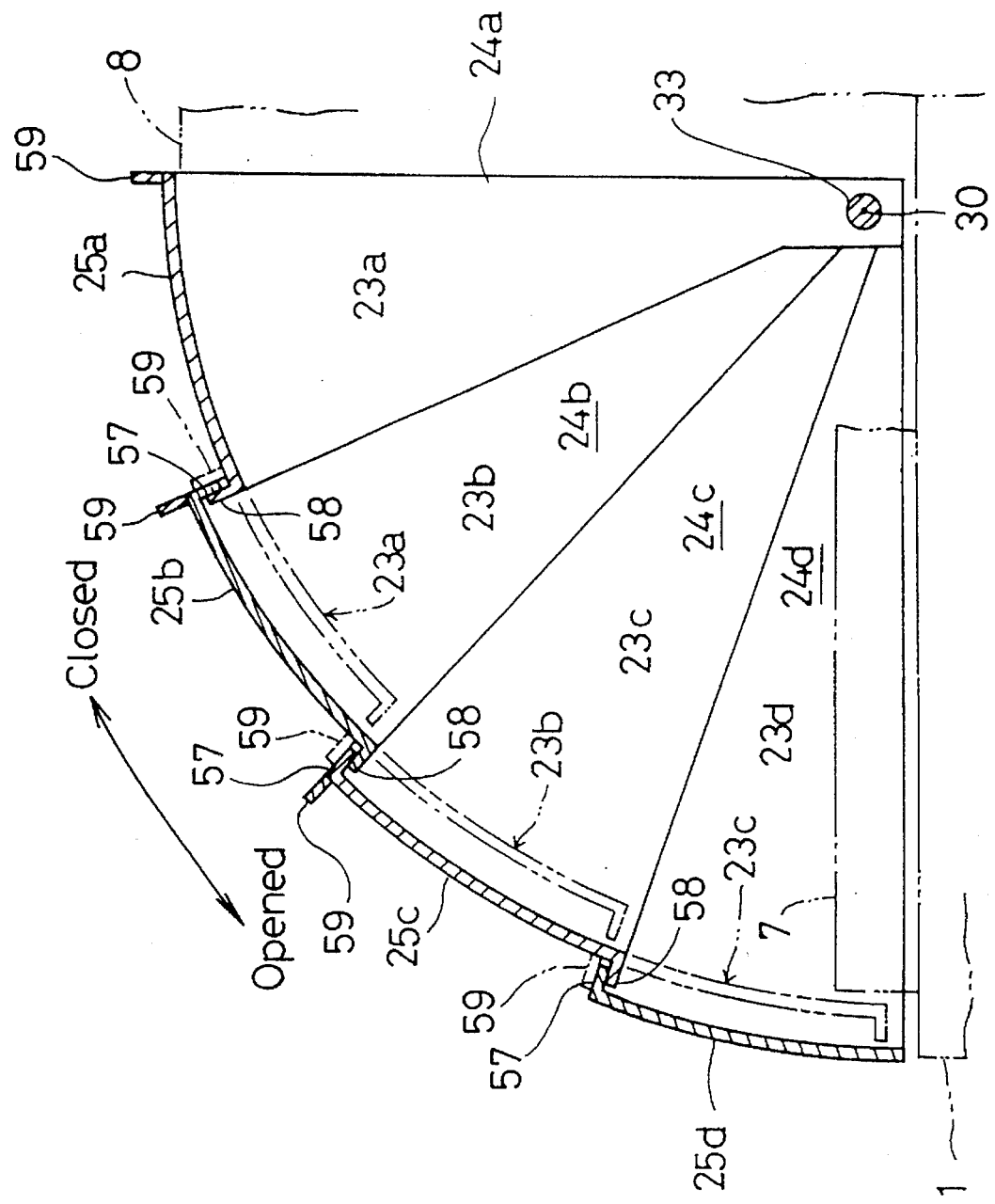
FIG. 25 is a side view, in longitudinal section, of a cover in another embodiment of the invention.

According to this arrangement, when it is desired open the cover 23, the first divisional cover portion 23a is turned in the opening direction (toward the pit 41), whereby, as shown in phantom lines in FIG. 25, the first engaging tooth 59 of the first divisional cover portion 23a is separated from the engaged tooth 57 of the second divisional cover portion 23b while the second engaging tooth 59 of the first divisional cover portion 23a engages the engaged tooth 57 of the second divisional cover portion 23b to forcibly turn the second divisional cover portion 23b in the opening direction (toward the bit 41). Similarly, the second engaging tooth 59 of the second divisional cover portion 23b engages the engaged tooth 57 of the third divisional cover portion 23c to forcibly turn the third divisional cover portion 23c in the opening direction (toward the pit 41) while the second engaging tooth 59 of the third divisional cover portion 23c engages the engaged tooth 57 of the fourth divisional cover portion 23d to forcibly turn the fourth divisional cover portion 23d in the opening direction (toward the pit 41). In this manner, the second through fourth divisional cover portions 23b through 23d are folded and contracted in operative association with the first divisional cover portion 23a, whereby the cover 23 is opened, received in the pit 41 in its folded form with the fourth divisional cover portion 23d positioned on the outermost side and the first divisional cover portion 23a positioned on the innermost side.

When it is desired to close the cover 23, as in the case of the embodiment shown in FIGS. 21 through 24, the first engaging tooth 58 engages the engaged tooth 57, whereby the second through fourth divisional cover portions 23b through 23d are unfolded in operative association with the first divisional cover portion 23a, so that the cover 23 is reliably closed.

Another embodiment of the invention will now be described with reference to FIG. 26.

The first divisional cover portion 23a is the greatest in the distance between the inner surfaces and in radius, followed by the second divisional cover portion 23b, the third divisional cover portion 23c and the fourth divisional cover portion 23d in the decreasing order. As shown in FIG. 26, the closing ends of the divisional cover portions 23b through 23d are each formed with an engaged tooth 57 bent outwardly. Further, the opening ends of the adjacent divisional cover portions 23a through 23c are each formed with a first locking tooth 58 adapted to engage the associated one of the engaged teeth 57 of the adjacent divisional cover portions 23b through 23d during closing movement.

The closing ends of the divisional cover portions 23a through 23c are each formed with a second engaging tooth 59 bent inwardly to engage the associated one of the engaged teeth 57 of the adjacent divisional cover portions 23b through 23d during opening movement.

Figure 26:
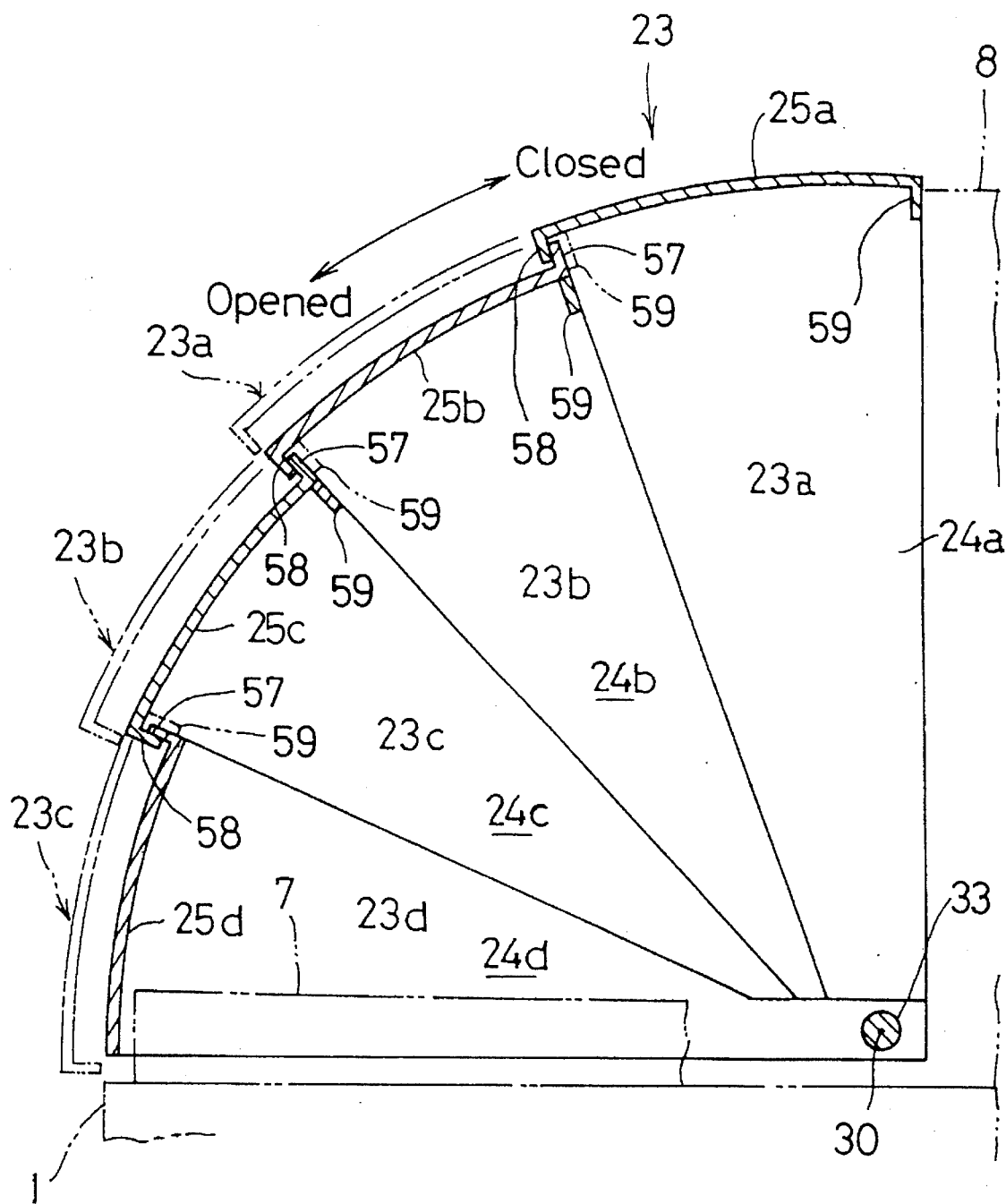
FIG. 26 is a side view, in longitudinal section, of a cover in another embodiment of the invention.

According to this arrangement, when it is desired to open the cover 23, the first divisional cover portion 23a is turned in the opening direction (toward the pit 41), whereby, as shown in phantom lines in FIG. 26, the first engaging tooth 59 of the first divisional cover portion 23a is separated from the engaged tooth 57 of the second divisional cover portion 23b while the second engaging tooth 59 of the first divisional cover portion 23a engages the engaged tooth 57 of the second divisional cover portion 23b to forcibly turn the second divisional cover portion 23b in the opening direction (toward the bit 41). Similarly, the second engaging tooth of 59 of the second divisional cover portion 23b engages the engaged tooth 57 of the third divisional cover portion 23c to forcibly turn the third divisional cover portion 23c in the opening direction (toward the pit 41) while the second engaging tooth 59 of the third divisional craver portion 23c engages the engaged tooth 57 of the fourth divisional cover portion 23d to forcibly turn the fourth divisional cover portion 23d in the opening direction (toward the pit 41).

In this manner, the second through fourth divisional cover portions 23b through 23d are folded and contracted in operative association with the first divisional cover portion 23a, whereby the cover 23 is opened, received in the pit 41 in its folded form with the first divisional cover portion 23a positioned on the outermost side and the fourth divisional cover portion 23d positioned on the innermost side.

Further, when it is desired to close the cover 23, the first divisional cover portion 23a is turned in the closing direction (toward the controller 8), whereby, as shown in solid lines in FIG. 26, the first engaging tooth 58 of the first divisional cover portion 23a engages the engaged tooth 57 of the second divisional cover portion 23b, so that the second divisional cover portion 23b is also turned in the closing direction around the widthwise extending axes 30. And, Like the second divisional cover portion 23b, the third and fourth divisional cover portions 23c and 23d are turned in the closing direction around the widthwise extending axes 30 because of each first engaging tooth 58 engaging the associated engaged tooth 57. As a result of the second through fourth divisional cover portions 23b through 23d being unfolded in operative association with the first divisional cover portion 23a in this manner, the cover 23 is reliably closed.

Another embodiment of the present invention will now be described with reference to FIG. 27.

The opening ends of the divisional cover portions 23b through 23d are each formed with a second engaging tooth 59 bent outwardly to engage the associated one of the first engaging teeth 58 of the adjacent divisional cover portions 23a through 23c during opening movement.

Figure 27:
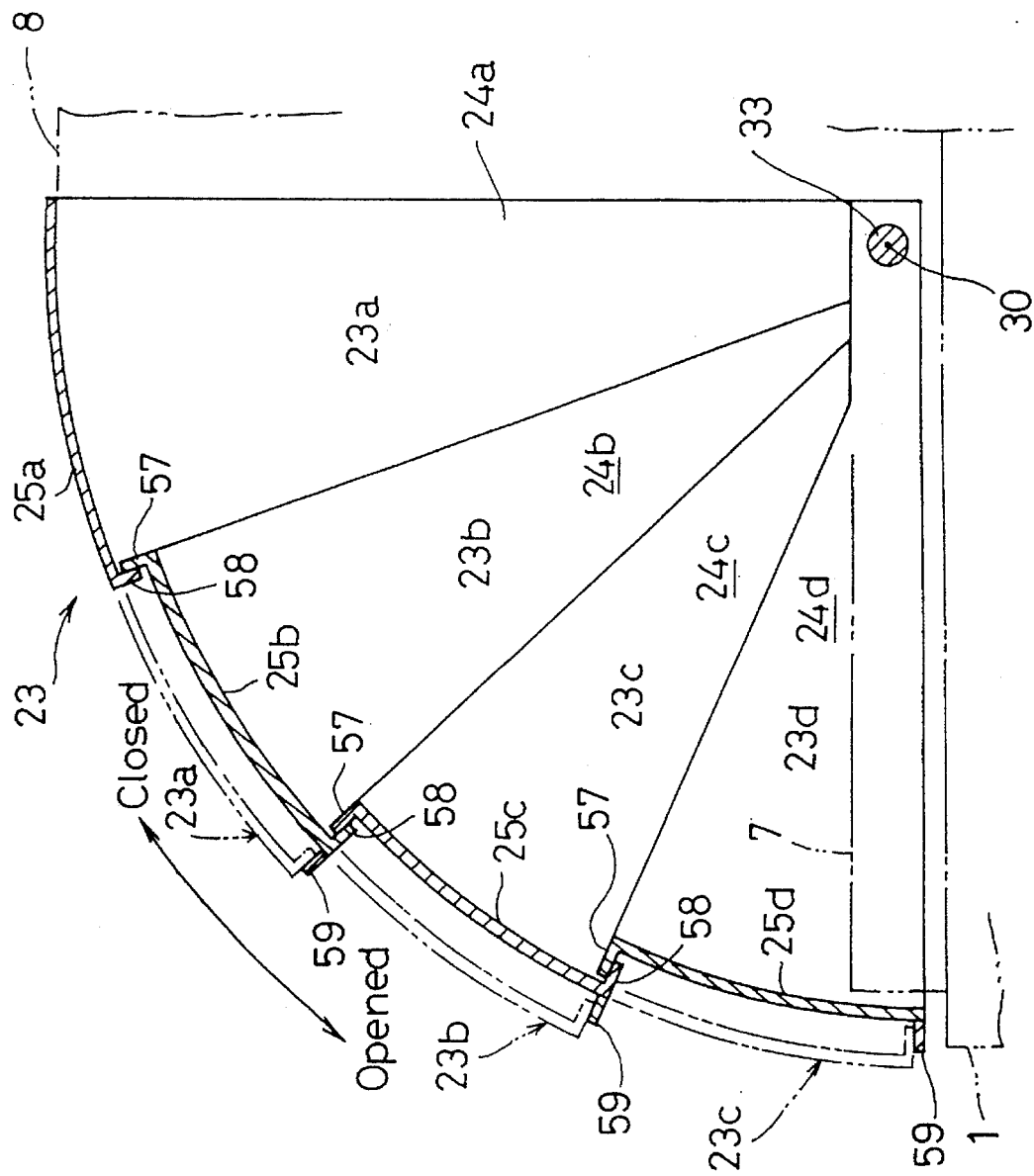
FIG. 27 is a side view, in longitudinal section of a cover in another embodiment of the invention.

According to this arrangement, when it is desired to open the cover 23, the first divisional cover portion 23a is turned in the opening direction (toward the pit 41), whereby, as shown in phantom lines in FIG. 27, the first engaging tooth 58 of the first divisional cover portion 23a is separated from the engaged tooth 57 of the second divisional cover portion 23b and then engages the second engaging tooth 59 of the second divisional cover portion 23b to forcibly turn the second divisional cover portion 23b in the opening direction (toward the bit 41). Similarly, the first engaging tooth 58 of the second divisional cover portion 23b engages the second engaging tooth 59 of the third divisional cover:portion 23c to forcibly turn the third divisional cover portion 23c in the opening direction (toward the pit 41) while the first engaging tooth 58 of the third divisional cover portion 23c engages the second engaging tooth 59 of the fourth divisional cover portion 23d to forcibly turn the fourth divisional cover portion 23d in the opening direction (toward the pit 41).

In this manner, the second through fourth divisional cover portions 23b through 23d are folded and contracted in operative association with the first divisional cover portion 23a, whereby the cover 23 is opened, received in the pit 41 in its folded form with the first divisional cover portion 23a positioned on the outermost side and the fourth divisional cover portion 23d positioned on the innermost side.

When it is desired to close the cover 23, as in the case of the third embodiment, the first engaging tooth 58 engages the engaged tooth 57, whereby the second through fourth divisional cover portions 23b through 23d are unfolded in operative association with the first divisional cover portion 23a, so that the cover 23 is reliably closed.

In each embodiment described above, the cover 23 has been shown divided into four parts, ranging from the first divisional cover portion 23a to the fourth divisional cover portion 23d; however, the invention is not limited to the division into four parts but the division into a plurality of parts is possible.

Another embodiment of the invention will now be described with reference to FIGS. 28 through 33.

Figure 28:
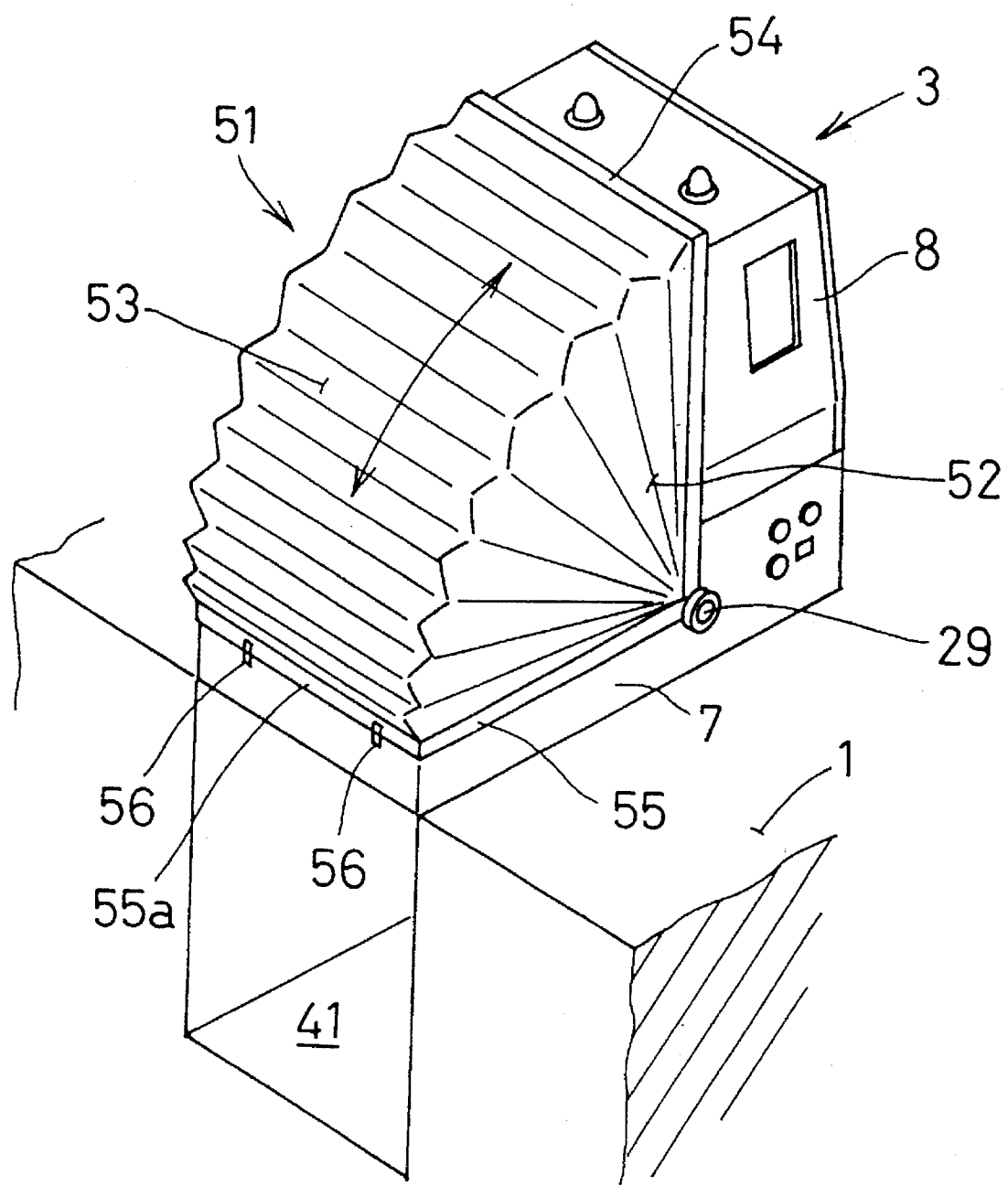
FIG. 28 is a perspective view of an internal combustion engine tester with a bellows type cover closed in another embodiment of the invention.
Figure 29:
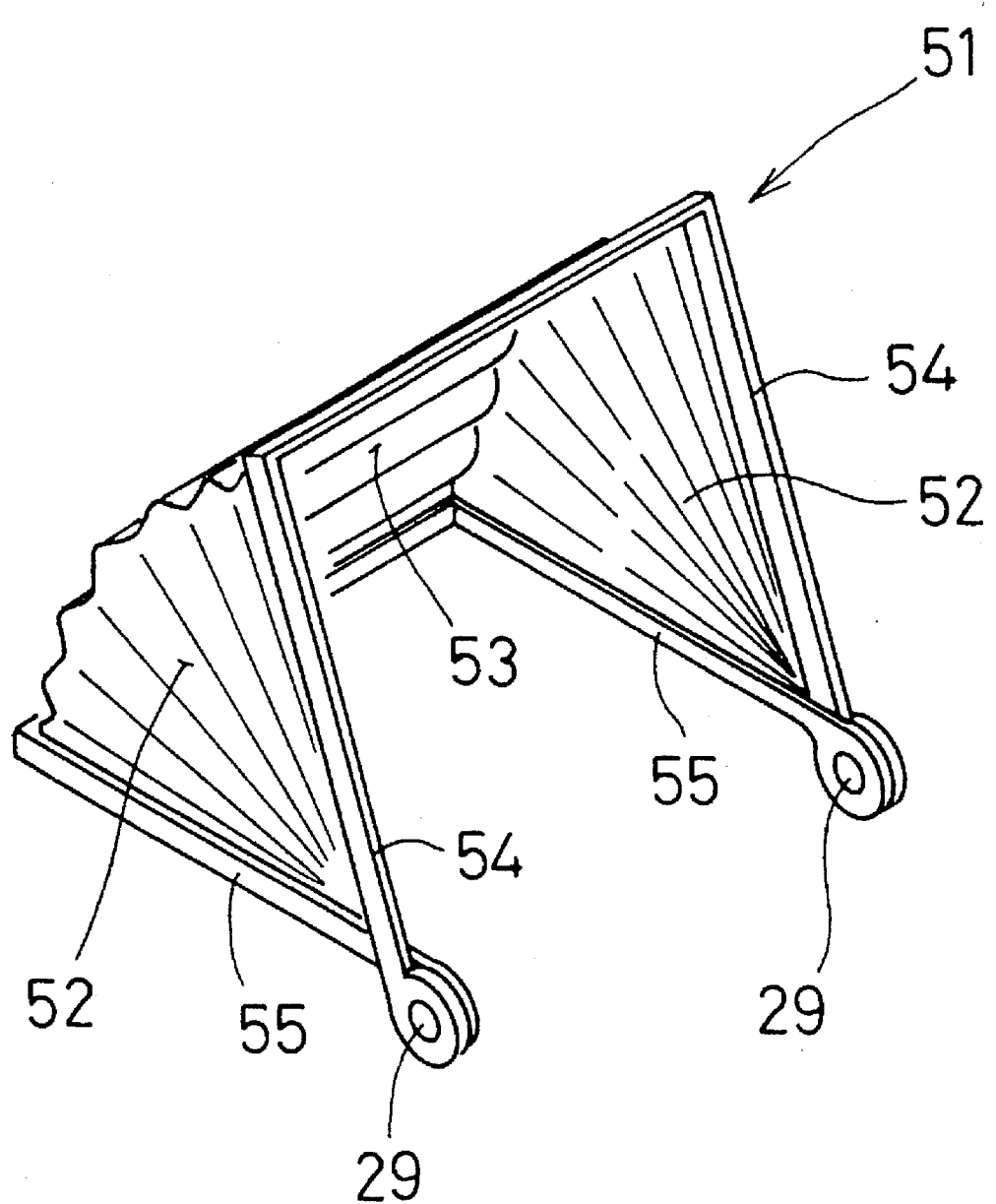
FIG. 29 is a perspective view of the bellows type cover.

As shown in FIGS. 28 and 29, a cover 51 comprises a pair of sectorial lateral plates 52 which can be positioned on both sides of the internal combustion engine support block 7, and an arcuate outer plate 53 disposed between the outer edges of said lateral plates 52. These lateral plates 52 and outer plate 53 are formed in bellows form using a heat-resistant fabric or the like. Further, the opposite ends of the cover 51 have frames 54 and 55 which are gate-shaped as seen in front view.

Figure 30:
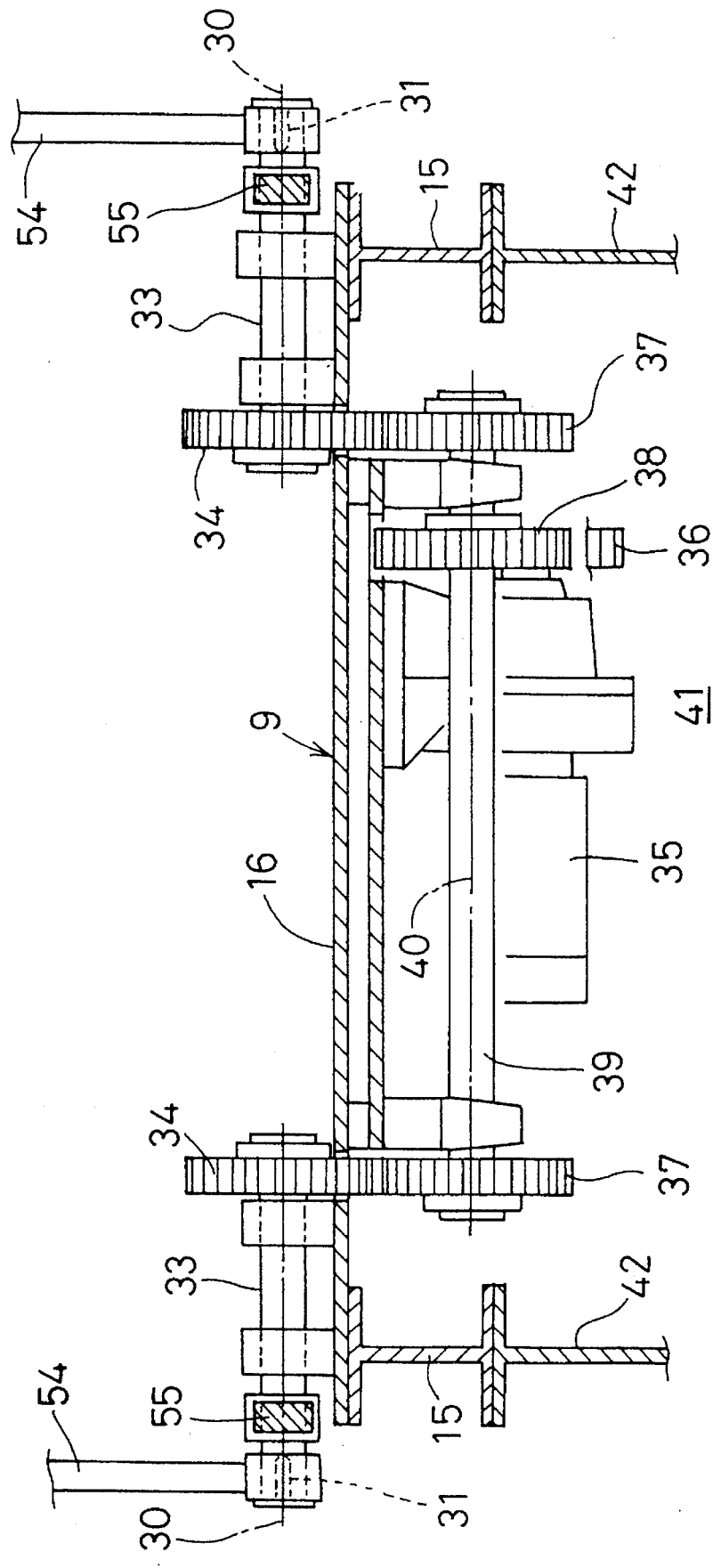
FIG. 30 is a front view showing a bellows type cover turning mechanism.
Figure 31:
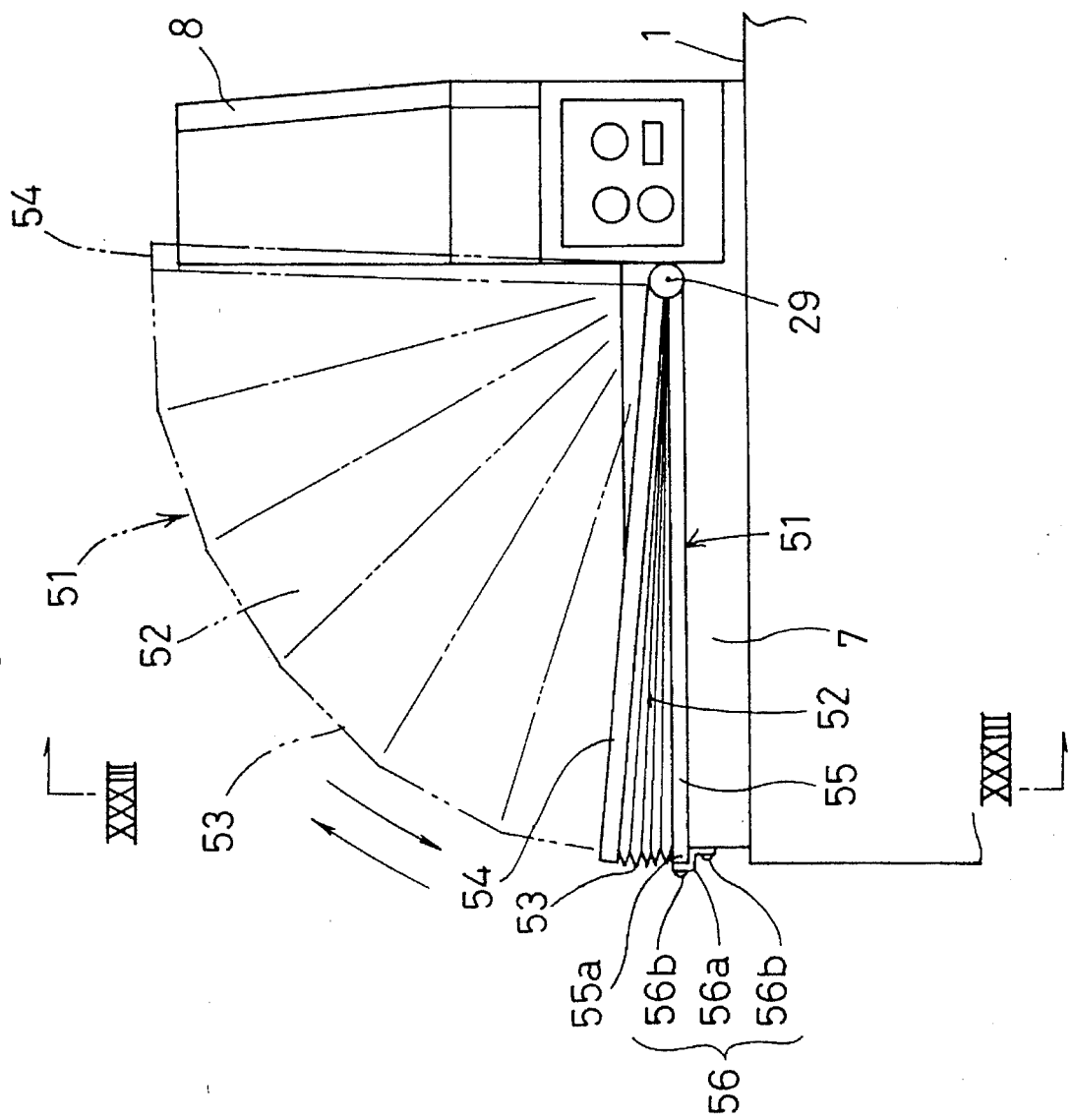
FIG. 31 is a side view, partly broken away, of the internal combustion engine tester.
Figure 32:
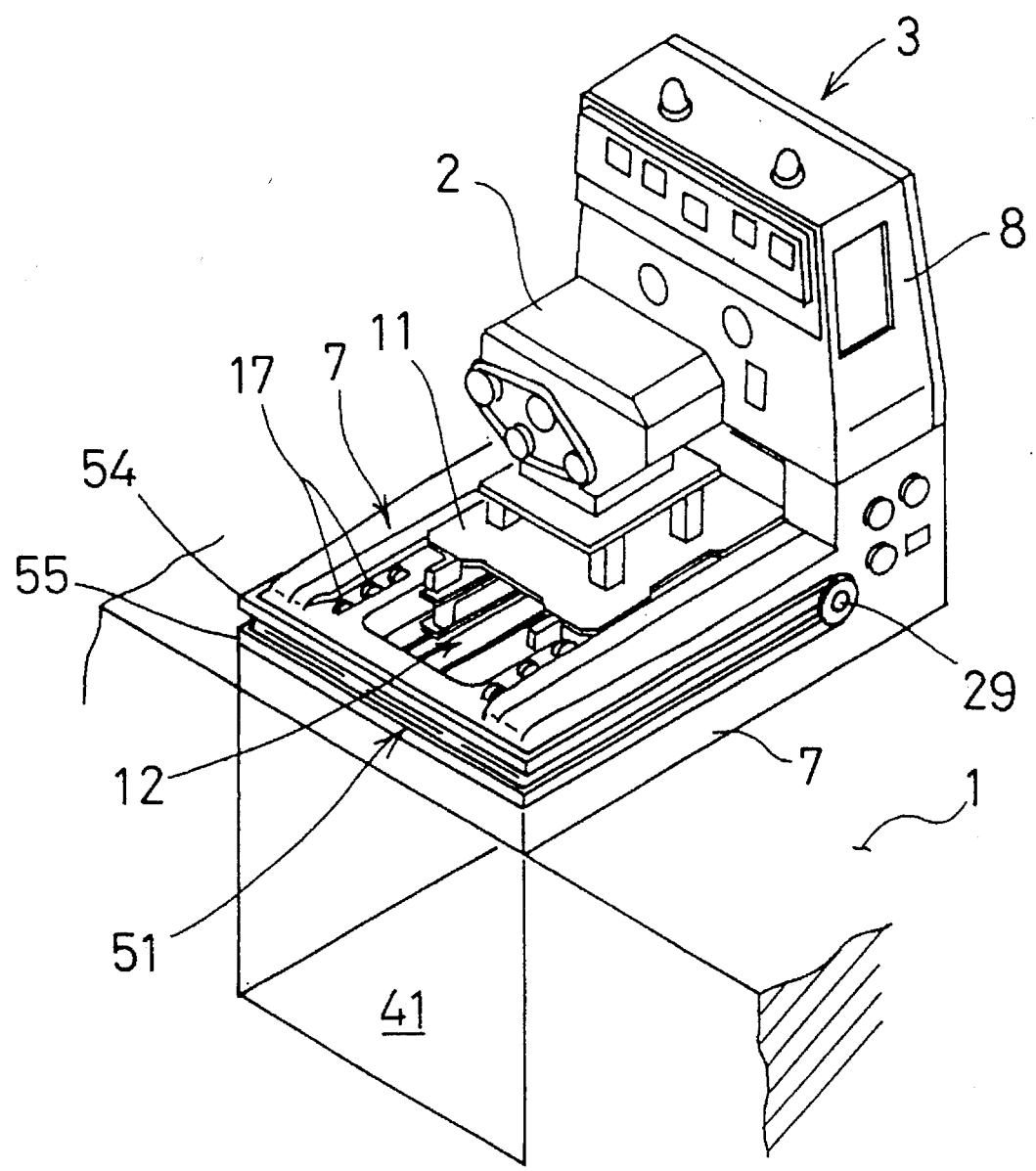
FIG. 32 is a perspective view of the internal combustion engine tester with the bellows type cover opened.
Figure 33:
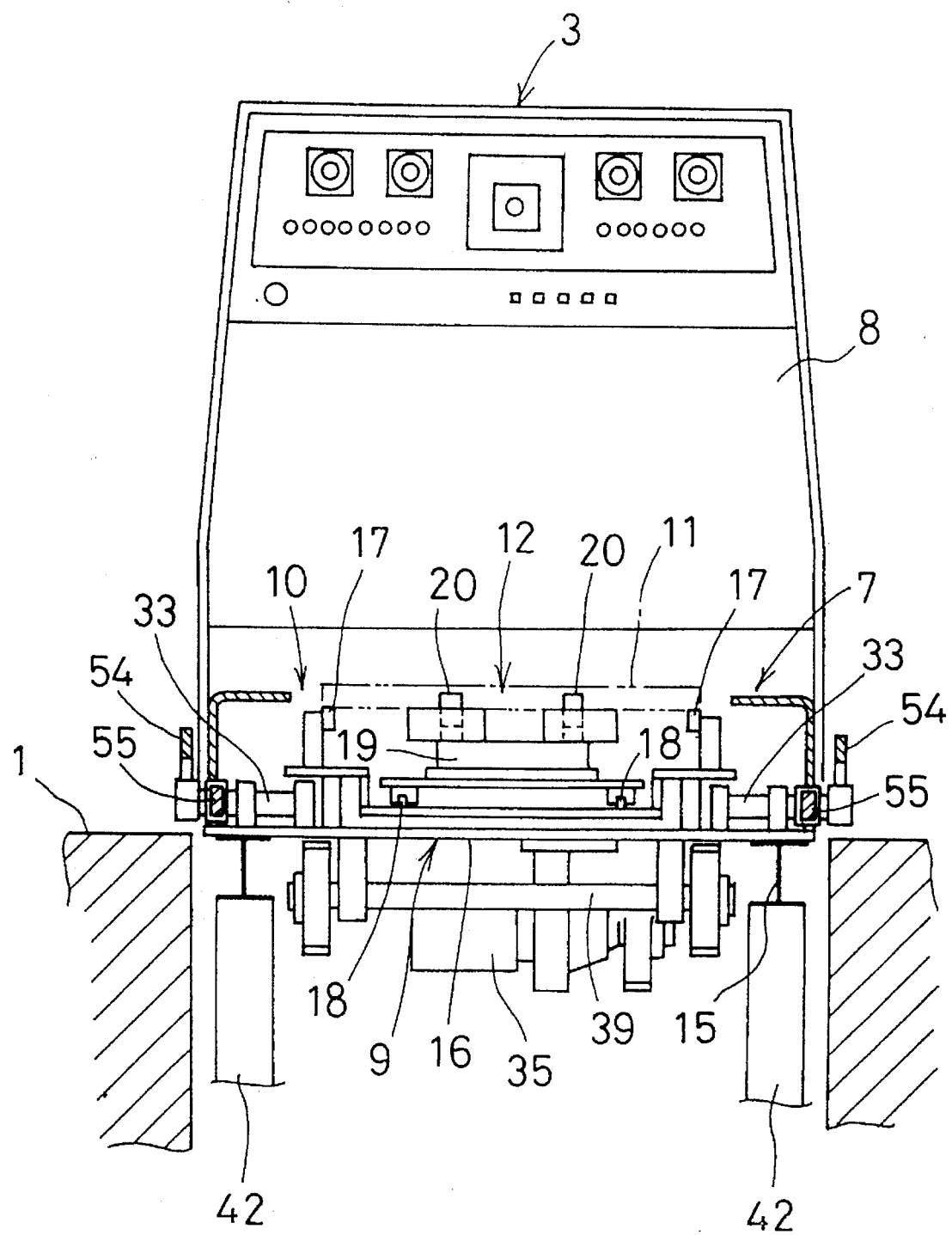
FIG. 33 is a view taken in the direction of arrow XXXIII—XXXIII in FIG. 31.

As shown in FIG. 30, the pivots of the lateral plates 52, i.e., the inner ends of the frames 54 and 55 are turnably fitted on a pair of rotary shafts 33 turnably mounted on the base frame 9. The inner ends of the turnable frames 54 attached to the closing side are operatively connected to the rotary shafts 33 by joint keys 31. Further, as shown in FIGS. 28 and 31, the outer side 55a connected to the fixed frames 55 attached to the opening side is fixed to the front end of the internal combustion engine support block 7 by a lock device comprising a fixing plate 56a and set screws 56b. Thereby, the cover 51 is turnable around the widthwise extending axes 30 with the pivots of the lateral plates 52 serving as fulcrums 29 and can be folded and contracted in the turning direction. In addition, the numeral 35 denotes an electric motor for turning the cover 51.

The function of the above arrangement will now be described.

When a test on an internal combustion engine 2 is started, as shown in FIG. 24, the electric motor 35 is driven to rotate the rotary shafts 33 in one direction around the widthwise extending axes 30 for opening movement. Thus, as shown in solid lines in FIGS. 31 and 32, since the turnable frames 54 are turned toward the fixed frames 55 together with the rotary shafts 33, the lateral plates 52 and outer plate 53 which are in bellows form are contracted to open the cover 51. When the cover 51 is opened in this manner, the space occupied by the cover 1 can be reduced.

Further, when it is desired to close the cover 51, the electric motor 35 is reversed to turn the rotary shafts 33 in the other direction around the widthwise extending axes 30 for closing operation. Thus, as shown in phantom lines in FIGS. 28 and 31, since the turnable frames 54 are turned together with the rotary shafts 33 toward the con,roller 8, the lateral plates 52 and outer plate 53 which are in bellows form are unfolded to close the cover 51. Thereby, the internal combustion engine support block 7 is covered from above with the cover 51. Thus, the cover 51 effects sound proofing and dust proofing during test and maintains safety outside the cover 51 even if a trouble occurs in the internal combustion engine 2 since the latter is isolated from the outside by the cover 51.

In the above embodiment, the lateral plates 52 and outer plate 53 have been shown made in bellows form using a heat-resistant fabric or the like; however, the lateral plates 52 or outer plate 53 may be formed with windows using a transparent heat-resistant sheet or the like.

What is claimed is:

1. A cover-equipped tester for internal combustion engines, comprising:

an internal combustion engine support block having a first end, a soundproof cover for said support block comprising a pair of spaced apart lateral plates having outer peripheries and an outer plate extending between the outer peripheries of the lateral plates, a controller at the first end of the support block, a cover storing section providing space beneath the support block adapted to receive and store said cover, and pivot means mounting said cover to said support block for pivotal movement between a closed position and an open position, said cover when in the closed position cooperating with the support block and the controller in defining a closed space for an internal combustion engine on the support block, said cover when in the open position occupying the space in the cover storing section beneath the support block.

2. A cover-equipped tester for internal combustion engines as set forth in claim 1, characterized in that the outer plate is shaped arcuately.

3. A cover-equipped tester for internal combustion engines as set forth in claim 1, characterized in that at least part of the cover is transparent.

4. A cover-equipped tester for internal combustion engines as set forth in claim 1, characterized in that the cover is made of stainless steel and at least part of the cover is transparent.

5. A cover-equipped tester for internal combustion engines as set forth in claim 1, characterized in that the tester includes a ventilator for ventilating the cover.

6. A cover-equipped tester for internal combustion engines as set forth in claim 1, characterized in that the cover has a closing end provided with a detector for detecting foreign matter present between the cover and the outer side of the controller.

7. A cover-equipped tester for internal combustion engines as set forth in claim 1, characterized in that the cover has a closing end and the controller has an outer side and the closing end of the cover overlaps the outer side of the controller in the closed position of the cover.

8. A cover-equipped tester for internal combustion engines as set forth in claim 1, characterized in that the cover is adapted to be unfolded and contracted as desired when turned.

9. A cover-equipped tester for internal combustion engines as set forth in claim 1, characterized in that the cover is of the multiplate foldable type.

10. A cover-equipped tester for internal combustion engines as set forth in claim 9, characterized in that the cover is of the multiplate foldable type comprising a plurality of divisional cover portions having inner ends, turnable with the inner ends of the divisional cover portions serving as fulcrums and adapted to be unfolded and contracted as desired when turned, said predetermined divisional cover portions being provided with first engaging portions adapted to engage adjacent divisional cover portions and second engaging portions adapted to engage adjacent divisional cover portions during closing movement.

11. A cover-equipped tester for internal combustion engines as set forth in claim 1, characterized in that the cover is in bellows form.

* * * * *